United States Patent [19]

Bellas et al.

[11] Patent Number: 5,142,034
[45] Date of Patent: Aug. 25, 1992

[54] CELLULOSE ESTER COMPOSITIONS AND PROCESS FOR THE PREPARATION THEREOF

[75] Inventors: Michael Bellas, Kingsport; Charles M. Buchanan, Bluff City; Kevin J. Edgar, Kingsport; Ted C. Germroth, Kingsport; Alan K. Wilson, Kingsport, all of Tenn.

[73] Assignee: Eastman Kodak Company, Rochester, N.Y.

[21] Appl. No.: 509,400

[22] Filed: Apr. 16, 1990

[51] Int. Cl.$^5$ .............................. C08B 3/06
[52] U.S. Cl. ........................ 536/58; 536/63; 536/64; 536/65; 536/67; 536/68; 536/69; 536/76; 536/79; 536/80; 536/81
[58] Field of Search ............ 536/58, 63, 64, 65, 536/67, 68, 69, 76, 79, 80, 81

[56] References Cited

U.S. PATENT DOCUMENTS

| | | | |
|---|---|---|---|
| 1,860,461 | 5/1932 | Hubert et al. | 536/76 |
| 1,880,560 | 10/1932 | Webber et al. | 536/69 |
| 1,984,147 | 12/1934 | Malm | 536/76 |
| 2,005,383 | 6/1935 | Murray et al. | 536/69 |
| 2,129,052 | 9/1938 | Fordyce | 536/69 |
| 2,327,770 | 8/1943 | Crane | 536/76 |
| 2,374,547 | 4/1945 | Lamborn | 536/76 |
| 2,448,082 | 8/1948 | Creamer | 536/69 |
| 2,469,395 | 5/1949 | Malm et al. | 536/76 |
| 2,470,191 | 5/1949 | Seymour et al. | 536/69 |
| 2,470,192 | 5/1949 | Seymour et al. | 536/76 |
| 2,772,267 | 11/1956 | Malm et al. | 536/76 |
| 2,801,239 | 7/1957 | Hiatt et al. | 536/76 |
| 2,836,590 | 5/1958 | Turner | 536/69 |
| 3,482,011 | 12/1969 | Bohrer | 536/69 |
| 3,520,874 | 7/1970 | Ueno et al. | 536/76 |
| 4,269,972 | 5/1981 | Yabune et al. | 536/76 |
| 4,342,865 | 8/1982 | Brewer et al. | 536/76 |
| 4,357,295 | 11/1982 | Haddad et al. | 536/76 |
| 4,415,734 | 11/1983 | Yabune et al. | 536/79 |
| 4,499,043 | 2/1985 | Yabe et al. | 536/76 |
| 4,543,409 | 9/1985 | Diamantoglou et al. | 536/68 |

FOREIGN PATENT DOCUMENTS

| | | |
|---|---|---|
| 1143485 | 10/1957 | France . |
| 63-105001 | 5/1988 | Japan . |
| 1388398 | 4/1988 | U.S.S.R. . |
| 317088 | 8/1930 | United Kingdom . |
| 356012 | 9/1931 | United Kingdom . |
| 437907 | 11/1935 | United Kingdom . |
| 488946 | 7/1938 | United Kingdom . |
| 496065 | 11/1938 | United Kingdom . |
| 568932 | 4/1945 | United Kingdom . |
| 581157 | 10/1946 | United Kingdom . |
| 696903 | 9/1953 | United Kingdom . |
| 755018 | 8/1956 | United Kingdom . |
| 2105725 | 3/1983 | United Kingdom . |

OTHER PUBLICATIONS

*Chemical Abstracts*, 99:7059d [Jpn. Kokai Tokkyo Koho JP 58 11,501 (83 11,501)], Jul. 1983.
WPIL, AN 81-10739D/07, Dec. 10, 1980, Derwent Publications (JP55158318).
T. Miyamoto et al., *J. Poly. Sci., Poly. Chem. Ed.*, 23, pp. 1373–1381 (1985).
K. Kamide et al., *Polym. J.*, 19, pp. 1405–1412 (1987).
V. W. Goodlett et al., *J. Polym. Sci.:* Part A-1, 9, pp. 155–161 (1971).
C. M. Buchanan et al., *Macromolecules*, 20, pp. 2750–2754 (1987).
C. M. Buchanan et al., *Carbohydrate Research*, 177, 228–234 (1988).
T. Miyamoto et al., *J. Polym. Sci.: Polym. Chem. Ed.*, 22, pp. 2363–2370 (1984).

(List continued on next page.)

*Primary Examiner*—Ronald W. Griffin
*Attorney, Agent, or Firm*—Thomas R. Savitsky; Betty J. Deaton; William P. Heath, Jr.

[57] ABSTRACT

Process for reducing the degree of substitution of cellulose esters employing Lewis acids as solvolysis promoters is disclosed. Novel low degree of substitution cellulose esters produced by the invention process are also described.

75 Claims, 8 Drawing Sheets

OTHER PUBLICATIONS

C. J. Malm et al., *Industrial Eng. Chemistry*, 49(1), pp. 79–83 (1957).

G. A. Petropavlovskii et al., *Zhurnal Prikladnoi Khimii*, 39(1), pp. 237–240 (1966) (English translation).

*Chemical Abstracts*, 89:112892m (G. Rakhmanberdiev et al., *Cellul. Chem. Technol.*, 12(2), pp. 153–176 (1978)).

G. Rakhmanberdiev et al., *Zhurnal Prikladnoi Khimi*, 46(2), pp. 416–419 (1973)(English translation).

A. Rehiner, *Tiba* 11, pp. 567–577, 643–651, 723–729 (1933).

*Chemical Abstracts*, 5:48041w (B. Isazhanov et al., *Mater. Resp. Knf. Tekst. Khim.*, 3, 82 (1974)).

L. A. Hiller, Jr., *J. Polymer Sci.*, 10, pp. 385–423 (1953).

E. Knoevenagel et al., *Cellulosechemie*, 3, pp. 113–124 (1922).

R. N. Haward et al., *J. Soc. Chem. Ind.*, 65, pp. 63–64 (1948).

*Chemical Abstracts*, 26:3377 (Canadian Patent 321,228 issued Apr. 5, 132, to C. J. Malm).

*Chemical Abstracts*, 24:6014 (French Patent 686,019 issued Mar. 4, 1929, to M. Klein).

CELLULOSE ESTER COMPOSITIONS AND PROCESS FOR THE PREPARATION THEREOF

This invention relates to processes for reducing the degree of substitution of cellulose esters. In one aspect, it relates to the preparation of cellulose esters having a low degree of substitution (DS). In a particular aspect, the present invention relates to the preparation of cellulose acetates having a low degree of substitution (cellulose monoacetates or CMA's). In another aspect, the present invention relates to the preparation of novel cellulose esters, as demonstrated by nuclear magnetic resonance spectroscopy techniques. In a further aspect, the present invention relates to the preparation of cellulose esters which have high affinity for water, as determined, for example, by the water solubility or absorption of such materials.

BACKGROUND OF THE INVENTION

Cellulose esters having a DS less than 3 (i.e., less than fully substituted) find wide application in commerce. These materials serve many markets such as molding plastics, clear sheets, filter tow, and as coatings polymers, to name a few forms and applications. Methods for their economical and selective preparation are clearly desirable.

Moreover, polymers which have affinity for water are of great commercial interest. Water-absorbent polymers, such as poly(acrylates), are used commercially in diapers, absorbent pads, and similar high-volume consumer goods. Water-soluble polymers also find widespread use in the marketplace. They are used in foods, oil field applications, cosmetics, and pharmaceuticals, to cite a few examples. It is clear, therefore, that new polymer compositions with high affinity for water would have considerable commercial potential. Similarly, new and superior processes for the manufacture of polymers with high water affinity would be of considerable benefit.

It is well known in the art that cellulose acetates with a low degree of substitution have high affinity for water. C. J. Malm (British Patent 356,012 (1929)) disclosed the preparation of cellulose monoacetate (CMA) by the sulfuric acid-catalyzed hydrolysis of cellulose triacetate (CTA) in aqueous sulfuric acid. The product, having a DS of 0.6–0.8 acetyls (DS = number of substituents per anhydroglucose ring), was soluble in water. This necessitated isolation by addition of a nonsolvent. It is difficult to avoid contamination of the CMA from this process by sulfate salts. Other drawbacks of the Malm procedure include the long reaction times and the necessity for continuous or sequential addition of water to maintain reaction rates, resulting in a dilute reaction mixture and difficulties in recovery of by-product acetic acid. Additionally, the sulfuric acid catalyst promotes rapid degradation of the molecular weight of the polymer.

Similar work by C. L. Crane (U.S. Pat. No. 2,327,770 (1943)) disclosed that cellulose diacetate could be hydrolyzed in aqueous acetone or aqueous alcohol using sulfuric acid catalyst to afford a water-soluble CMA. This process suffers shortcomings which are similar to those of the Malm process described above.

In U.S. Pat. No. 2,005,383, T. F. Murray and C. J. Staud disclosed the use of zinc iodide in ethanol to solvolyze cellulose triacetate (CTA). This process afforded a product with DS about 1.75, required long reaction times, and consumed large amounts of zinc iodide (10 parts ZnI per part CTA). Even with this amount of zinc iodide, 40 hours reaction time was required to produce the product having a DS of only 1.75.

U.S. Pat. No. 2,801,239 (1957, G. D. Hiatt, L. W. Blanchard, Jr., and L. J. Tanghe) teaches the use of zinc chloride as a catalyst for the acetylation of cellulose. The inventors state that the zinc chloride must be removed before the hydrolysis of the resulting ester because the zinc chloride limits the amount of water which may be used in the hydrolysis and increases the rate at which the viscosity (which is indicative of molecular weight) is reduced. This result would lead one to expect that Lewis acid metal salts would be undesirable catalysts for the solvolysis of cellulose esters.

In U.S. Pat. No. 2,836,590 (1958) H. W. Turner discloses high temperature (>180° C.) alcoholysis of cellulose acetate without the use of catalysts. At the temperatures disclosed by Turner, cleavage of the 1,4-glycosidic linkages of the cellulose ester backbone competes with the desired deacylation.

A different approach to CMA is disclosed by M. Diamantoglou, A. Brandner, and G. Mayer in U.S. Pat. No. 4,543,409 (1985). They acetylated cellulose in homogeneous solution (in N,N-dimethylacetamide (DMAC) containing lithium chloride). The product was a cellulose monoacetate as indicated by its low DS, but was not soluble in water. There are serious environmental and economic concerns associated with the use of the toxic and expensive DMAC as a commercial reaction solvent. It is believed in the art that the two basic requirements for water solubility are that (i) the DS be in the range of 0.5–1.1 and that the relative degree of substitution (RDS) at the three possible sites of substitution be roughly equal. Currently, only the method taught by Malm fulfills these requirements (Shibata et al., *J. Poly. Sci., Poly. Chem. Ed.* 1985, 23, 1373; Kamide et al. *Polym. J.* 1987, 19, 1405). There is, therefore, a need in the art for a process to prepare cellulose acetates with a low degree of substitution, and possessing high affinity for water. Such a process will desirably use solvents which are inexpensive and easily recycled. Such a process will also desirably employ catalysts which are either powerful enough to be used in small amounts or inexpensive enough to be used in large amounts when necessary. A desirable process will allow for easy and economical product isolation, and simple and economical recycle of solvents. Also desirable is a process which requires economically short reaction times, is reliable and repeatable, and uses commercially practical reaction temperatures. The combination of catalyst and reaction conditions will desirably be such that the molecular weight of the product polymer is not severely degraded.

STATEMENT OF THE INVENTION

In accordance with the present invention, cellulose esters of low degree of substitution (CELDS) are prepared in high yield by contacting cellulose esters of higher DS with a reactive solvent (water or alcohol) in the presence of a mild Lewis acid at a temperature sufficient to achieve the desired DS in the product. The product is isolated simply by cooling the reaction mixture and filtering off the precipitated product.

The practice of the current invention allows for the use of a wide variety of cellulose ester starting materials, catalysts, and reactive solvents. A wide variety of CELDS may be produced, including CMA's which have either good solubility in water or will absorb many times their weight in water. Several of these CMA's have been demonstrated to be new compositions by nuclear magnetic resonance (NMR) spectroscopy techniques (described in detail hereinbelow).

DETAILED DESCRIPTION OF THE INVENTION

Figure 1:
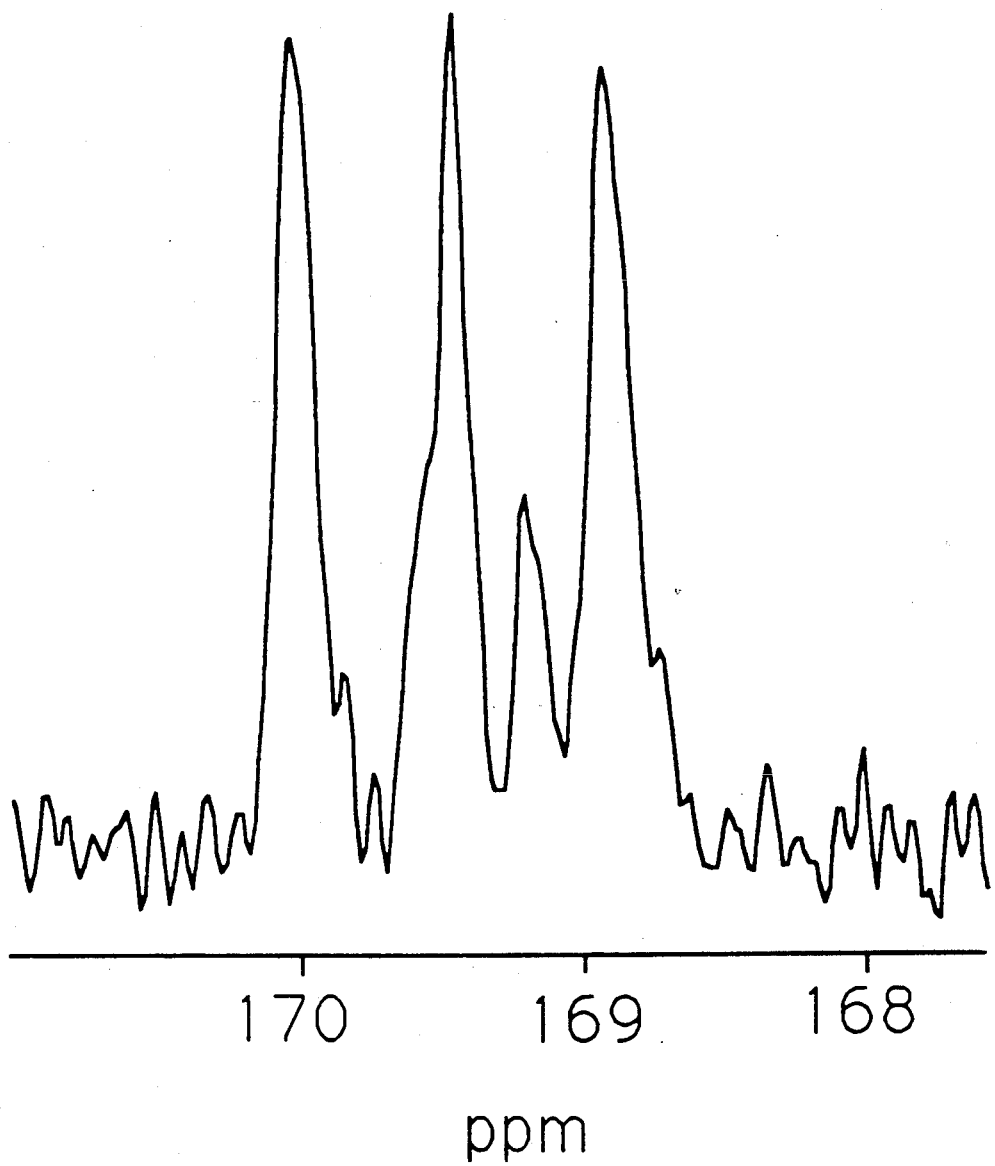
FIG. 1 is the carbon-13 NMR spectrum of the carbonyl carbons for Example 1.

In accordance with the present invention, there is provided a process for reducing the degree of substitution of $C_1$-$C_{20}$ esters of cellulose, said process comprising contacting at least one of said esters of cellulose with:
(i) a solvent system comprising
(a) at least one alcohol or polyol having up to 4 carbon atoms, and optionally,
(b) at least one co-solvent selected from: water, 1,4-dioxane, tetrahydrofuran, 1-methyl-2-pyrrolidinone, N,N-dimethylformamide, N,N-dimethylacetamide, ketones having in the range of 3 up to 12 carbon atoms, poly-oxygenated compounds having the structural formula:

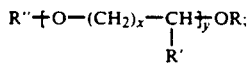

wherein R is an alkyl group having up to 10 carbon atoms, R' is H or an alkyl group having up to 10 carbon atoms, R" is H or an alkyl group having up to 10 carbon atoms, x can vary from 1 up to 6 and y can vary from 1 up to 6; and
(ii) an effective amount of at least one solvolysis promoter selected from:
alkali metal compounds which are at least sparingly soluble in the reaction medium,
alkaline earth compounds which are at least sparingly soluble in the reaction medium,
Group IIIA compounds which are at least sparingly soluble in the reaction medium,
Group IVA compounds which are at least sparingly soluble in the reaction medium,
Group IIB compounds which are at least sparingly soluble in the reaction medium,
Group IIIB compounds which are at least sparingly soluble in the reaction medium,
Group IVB compounds which are at least sparingly soluble in the reaction medium,
Group VB compounds which are at least sparingly soluble in the reaction medium,
Group VIB compounds which are at least sparingly soluble in the reaction medium,
Group VIIB compounds which are at least sparingly soluble in the reaction medium, or
Group VIII compound at least sparingly soluble in the reaction medium, as well as mixtures of any two or more thereof, wherein said contacting is carried out for a reaction time in the range of about 0.1 up to 48 hours, and a reaction temperature in the range of about 75° C. up to 200° C.

Further, in accordance with the present invention, there are provided novel compositions of matter comprising water absorbent cellulose acetates having:
(i) a degree of substitution falling in the range of 0.4 up to 1.2,
(ii) an inherent viscosity, measured at a temperature of 25° C. for a 0.25 gram sample in 100 mL of DMSO, of at least about 0.1 deciliter/gram, and
(iii) a carbon-13 nuclear magnetic resonance spectrum having
(a) a ratio of the area of acetyl carbonyl carbon resonances appearing between 169.56 and 169.51 ppm to the area of acetyl carbonyl carbon resonances appearing between 169.45 and 169.37 ppm of less than about 0.5,
(b) a ratio of the area of acetyl carbonyl carbon resonances appearing between 169.56 and 169.51 ppm to the area of the acetyl carbonyl carbon resonances appearing between 169.16 and 169.05 ppm of less than about 1.1,
(c) a ratio of the area of acetyl carbonyl carbon resonances appearing between 169.56 and 169.51 ppm to the area of acetyl carbonyl carbon resonances appearing between 169.56 and 169.05 ppm of less than about 0.25, and
(d) a ratio of the area of acetyl carbonyl carbon resonances appearing between 169.56 and 169.51 ppm to total DS of less than or equal to about 0.11, wherein said carbon-13 nuclear magnetic resonance spectrum is obtained at 67.9 MHz and at 80° C. for a solution of cellulose acetate in DMSO-$d_6$, said solution having a concentration of 100 mg of cellulose acetate per ml of DMSO-$d_6$ and in the range of about 3 to about 50 mg of chromium (III) acetylacetonate per 300 mg of cellulose acetate and wherein the resonances are reported in ppm relative to tetramethylsilane with residual DMSO as an internal reference.

In addition, in accordance with the present invention, there are provided novel compositions of matter comprising water soluble cellulose acetates having:
(i) a degree of substitution falling in the range of 0.4 up to 1.2,
(ii) an inherent viscosity, measured at a temperature of 25° C. for a 0.25 gram sample in 100 mL of DMSO, of at least about 0.1 deciliter/gram, and
(iii) a carbon-13 nuclear magnetic resonance spectrum having
(a) a ratio of the area of acetyl carbonyl carbon resonances appearing between 169.56 and 169.51 ppm to the area of acetyl carbonyl carbon resonances appearing between 169.45 and 169.37 ppm of greater than about 0.5,
(b) a ratio of the area of acetyl carbonyl carbon resonances appearing between 169.56 and 169.51 ppm to the area of acetyl carbonyl carbon resonances appearing between 169.16 and 169.05 ppm of greater than about 1.1, (c) a ratio of the area of acetyl carbonyl carbon resonances appearing between 169.56 and 169.51 ppm to the area of acetyl carbonyl carbon resonances appearing between 169.56 and 169.05 ppm of greater than about 0.25, and (d) a ratio of the area of acetyl carbonyl carbon resonances appearing between 169.56 and 169.51 ppm to total DS of greater than about 0.11, wherein said carbon-13 nuclear magnetic resonance spectrum is obtained at 67.9 MHz and at 80° C. for a solution of cellulose acetate in DMSO-$d_6$, said solution having a concentration of 100 mg of cellulose acetate per ml of DMSO-$d_6$ and in the range of about 3 to about 50 mg of chromium (III) acetylacetonate per 300 mg of cellulose acetate and wherein the resonances are reported in ppm relative to tetramethylsilane with residual DMSO as an internal reference.

As should be apparent from the water absorbent and water soluble cellulose acetates described above, many of the novel cellulose esters obtained in the practice of the present invention can be uniquely characterized by determining the ratio, in the carbon-13 nuclear magnetic resonance spectrum, of the area of specified acetyl carbonyl carbon resonances to one another.

The acetyl carbonyl carbon resonances appearing between 169.56 and 169.51 ppm are predominantly 3-monoacetyl monomer; those appearing between 169.45 and 169.37 ppm are predominantly 3 acetyl of the 2,3-diacetyl monomer; those appearing between 169.16 and 169.05 ppm are predominantly 3 acetyl of the triacetyl monomer; and those acetyl carbonyl carbon resonances appearing between 169.56 and 169.05 ppm are predominantly total 3 acetyl. The numbering of the carbon atoms for the anhydroglucose rings of the cellulose esters described herein is conventional; i.e., the numbering is as follows:

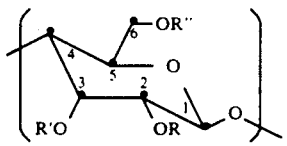

For the novel water absorbent cellulose acetates of the present invention it is preferred that:

(a) the ratio of the area of acetyl carbonyl carbon resonances appearing between 169.56 and 169.51 ppm to the area of acetyl carbonyl carbon resonances appearing between 169.45 and 169.37 ppm is less than 0.5, more preferably 0.46 to 0.0;

(b) the ratio of the area of acetyl carbonyl carbon resonances appearing between 169.56 and 169.51 ppm to the area of the acetyl carbonyl carbon resonances appearing between 169.16 and 169.05 ppm of less than about 1.1, more preferably 1.0 to 0.0;

(c) a ratio of the area of acetyl carbonyl carbon resonances appearing between 169.56 and 169.51 ppm to the area of acetyl carbonyl carbon resonances appearing between 169.56 and 169.05 ppm of less than about 0.25, more preferably 0.24 to 0.0, and (d) a ratio of the area of the acetyl carbonyl carbon resonances appearing between 169.56 and 169.51 ppm to the total DS of less than or equal to about 0.11, more preferably 0.11 to 0.0.

For the novel water soluble cellulose acetates of the present invention it is preferred that:

(a) the ratio of the area of acetyl carbonyl carbon resonances appearing between 169.56 and 169.51 ppm to the area of acetyl carbonyl carbon resonances appearing between 169.45 and 169.37 ppm is greater than about 0.5, more preferably 0.54 to 1.5;

(b) the ratio of the area of acetyl carbonyl carbon resonances appearing between 169.56 and 169.51 ppm to the area of the acetyl carbonyl carbon resonances appearing between 169.16 and 169.05 ppm of greater than about 1.1, more preferably 1.1 to 2.5;

(c) a ratio of the area of acetyl carbonyl carbon resonances appearing between 169.56 and 169.51 ppm to the area of acetyl carbonyl carbon resonances appearing between 169.56 and 169.05 ppm of greater than about 0.25, more preferably 0.26 to 0.40, and (d) a ratio of the total of the acetyl carbonyl carbon resonances appearing between 169.56 and 169.51 ppm to total DS of greater than about 0.11, more preferably 0.13 to 0.25.

The novel cellulose acetates described above (both the water absorbent and water soluble esters) have a degree of substitution (DS) of 0.4 to 1.2, preferably 0.4 to 0.8, and, therefore, such cellulose acetates are alternatively referred to herein as cellulose monoacetates or CMA's. In addition to CMA's, the process of the invention also produces other novel esters and mixed esters. Such novel cellulose esters include cellulose propionate, cellulose butyrate, cellulose acetate propionate, and cellulose acetate butyrate.

Generally, CMA's (as well as other cellulose esters) produced by the process of the invention will have substitution patterns characteristic of the particular solvolysis promoter (alternatively referred to herein as catalyst) employed.

For example, a water absorbent CMA prepared by the invention process employing a Mg-based catalyst will typically have a ratio of the area of the acetyl carbonyl carbon resonances appearing at 169.56 to 169.51 ppm, relative to tetramethylsilane, to the area of the acetyl carbonyl carbon resonances appearing at 169.45 to 169.37 ppm, of less than about 0.5, preferably about 0.0; a ratio of the area of the acetyl carbonyl carbon resonances appearing at 169.56 to 169.51 ppm, relative to tetramethylsilane, to the area of the acetyl carbonyl carbon resonances appearing at 169.16 to 169.05 ppm, of less than about 1.1, preferably about 0.0; a ratio of the area of the acetyl carbonyl carbon resonances appearing at 169.56 to 169.51 ppm, relative to tetramethylsilane, to the area of the acetyl carbonyl carbon resonances appearing at 169.56 to 169.05 ppm of less than about 0.25, preferably about 0.0; and a ratio of the acetyl carbonyl carbon resonances appearing between 169.56 and 169.51 ppm to total DS of less than or equal to about 0.11, preferably about 0.0; when the conditions identical to those described hereinabove are employed, i.e., the carbon-13 nuclear magnetic resonance spectrum is obtained at 67.9 MHz and about 80° C. for a solution of cellulose ester in DMSO-$d_6$, said sample having a concentration of about 100 mg of cellulose ester per mL of DMSO-$d_6$ and in the range of about 3 up to 50 mg of chromium (III) acetylacetonate per 300 mg of CMA.

Similarly, water soluble CMA prepared by the invention process employing a Mo-based catalyst will typically have a ratio of the area of the acetyl carbonyl carbon resonances appearing at 169.56 to 169.51 ppm, relative to tetramethylsilane, to the area of the acetyl carbonyl carbon resonances appearing at 169.45 to 169.37 ppm, in the range of about 0.54 to about 1.0, preferably about 0.55 to about 0.87 and a ratio of the area of the acetyl carbonyl carbon resonances appearing at 169.56 to 169.51 ppm, relative to tetramethylsilane, to the area of the acetyl carbonyl carbon resonances appearing at 169.16 to 169.05 ppm, of greater than about 2.2; a ratio of the area of the acetyl carbonyl carbon resonances appearing at 169.56 to 169.51 ppm, relative to tetramethylsilane, to the area of the acetyl carbonyl carbon resonances appearing at 169.56 to 169.05 ppm of about 0.35 to about 0.36; and a ratio of the acetyl carbonyl carbon resonances appearing at 169.56 to 169.51 ppm to total DS of greater than about 0.11, preferably about 0.19 to about 0.20, wherein the identical conditions described above for the Mg-based catalyst are employed.

Furthermore, water absorbent CMA prepared employing Sn-based catalysts will typically have a ratio of the total area of the acetyl carbonyl carbon resonances appearing at 169.56 to 169.51 ppm, relative to tetramethylsilane, to the area of the acetyl carbonyl carbon resonances appearing at 169.45 to 169.37 ppm, of less than about 0.5, preferably about 0.28, and a ratio of the area of the acetyl carbonyl carbon resonances appearing at 169.56 to 169.51 ppm, relative to tetramethylsilane, to the area of the acetyl carbonyl carbon resonances appearing at 169.16 to 169.05 ppm, of less than about 1.6; a ratio of the area of the acetyl carbonyl carbon resonances appearing at 169.56 to 169.51 ppm, relative to tetramethylsilane, to the area of the acetyl carbonyl carbon resonances appearing at 169.56 to 169.05 ppm of less than about 0.25, preferably about 0.19; and a ratio of the acetyl carbonyl carbon resonances appearing at 169.56 to 169.51 ppm to total DS of less than or equal to about 0.11, wherein the identical conditions described above for the Mg-based catalyst are employed.

Also, water absorbent CMA prepared employing Zn-based catalysts will typically have a ratio of the area of the acetyl carbonyl carbon resonances appearing at 169.56 to 169.51 ppm, relative to tetramethylsilane, to the area of the acetyl carbonyl carbon resonances appearing at 169.45 to 169.37 ppm, in the range of about 0.2 to about 0.5, preferably about 0.22 to about 0.46 and a ratio of the area of the acetyl carbonyl carbon resonances appearing at 169.56 to 169.51 ppm, relative to tetramethylsilane, to the area of the acetyl carbonyl carbon resonances appearing at 169.16 to 169.05 ppm, of less than about 1.1; a ratio of the area of the acetyl carbonyl carbon resonances appearing at 169.56 to 169.51 ppm, relative to tetramethylsilane, to the area of the acetyl carbonyl carbon resonances appearing at 169.56 to 169.05 ppm of about 0.13 to about 0.24; and a ratio of the acetyl carbonyl carbon resonances appearing at 169.56 to 169.51 ppm to total DS of less than or equal to about 0.11, preferably about 0.06 to about 0.11, wherein the identical conditions described above for the Mg-based catalyst are employed.

Cellulose esters contemplated for use in the practice of the present invention are materials comprising repeating units having the structure:

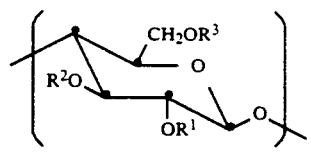

wherein each of $R^1$, $R^2$, and $R^3$ are independently selected from the group consisting of: hydrogen, alkanoyl, branched alkanoyl, aroyl, and heteroaroyl. The alkanoyl, aroyl and heteroaroyl groups typically contain up to 20 carbon atoms. Typical cellulose esters can have from 2 (e.g., cellobiose) to about 5000 repeating anhydroglucose units. Starting esters typically have a degree of substitution falling in the range of about 2 up to 3; with preferred starting materials typically having a degree of substitution falling in the range of about 2.4 up to 2.6. Preferred cellulose esters for use in the present invention are $C_1$-$C_6$ esters which include cellulose acetate, cellulose propionate, cellulose butyrate, cellulose acetate propionate, cellulose acetate butyrate, and the like.

As used herein, the term "degree of substitution" refers to the average total number of acyl substituents per anhydroglucose ring of the cellulose molecule.

Product cellulose esters produced by the practice of the present invention typically have a degree of substitution at least 0.1 DS lower than the starting cellulose ester, preferably at least about 0.4, more preferably about 0.4 to about 2.0, and most preferably about 1.5 to about 2.0, and an inherent viscosity, measured at a temperature of 25° C. for a 0.25 gram sample in 100 mL of DMSO, of at least about 0.1 deciliter/gram, preferably about 0.2 to about 2.5 deciliters/gram.

More specifically, the novel product water absorbent cellulose acetates of the present invention preferably have an inherent viscosity, measured as described above, of about 0.1 to about 2.5 deciliters/gram, more preferably about 1.3 to about 2.5 deciliters/gram. Also, the weight average molecular weight ($M_w$) of the novel water absorbent cellulose acetates is preferably greater than about $2.0 \times 10^5$.

Similarly, the novel product water soluble cellulose acetates of the present invention preferably have an inherent viscosity, measured as described above, of about 0.1 to about 2.5 deciliters/gram, more preferably about 0.1 to about 1.3 deciliters/gram. Also the $M_w$ of the novel water soluble cellulose acetates is preferably less than about $2.0 \times 10^5$.

Solvent systems contemplated for use in the practice of the present invention comprise:
(a) at least one alcohol or polyol having up to 7 carbon atoms, preferably up to 4 carbon atoms, and optionally,
(b) at least one co-solvent selected from: water, 1,4-dioxane, tetrahydrofuran, 1-methyl-2-pyrrolidinone, N,N-dimethylformamide, N,N-dimethylacetamide, ketones having in the range of 3 up to 12 carbon atoms, polyoxygenated compounds having the structural formula:

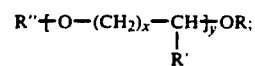

wherein R is an alkyl group having up to 10 carbon atoms, R' is H or an alkyl group having up to 10 carbon atoms, R" is H or an alkyl group having up to 10 carbon atoms, x can vary from 1 up to 6 and y can vary from 1 up to 6.

Exemplary alcohols or polyols contemplated for use in the practice of the present invention include methanol, ethanol, n-propanol, n-butanol, isopropyl alcohol, benzyl alcohol and ethylene glycol. Presently preferred alcohols or polyols include methanol, ethanol, and n-propanol. Methanol is the presently most preferred alcohol for use in the practice of the present invention because of its ready availability, its relatively low cost and ease of handling.

Co-solvents can optionally be employed in combination with the alcohol or polyol component. Exemplary co-solvents include water; 1,4-dioxane; tetrahydrofuran; 1-methyl-2-pyrrolidinone; N,N-dimethylformamide; N,N-dimethylacetamide; ketones such as acetone, 2-butanone, 2-pentanone, or 4-methyl-2-pentanone; polyoxygenated compounds such as glyme, diglyme, ethylene glycol monomethyl ether, ethylene glycol monoethyl ether, ethylene glycol monopropyl ether, ethylene glycol monobutyl ether, propylene glycol monomethyl ether, propylene glycol monoethyl ether, propylene glycol monopropyl ether, or propylene glycol monobutyl ether, and the like, as well as mixtures of any two or more thereof.

Presently preferred co-solvents include water and 1-methyl-2-pyrrolidinone.

When used, the quantity of co-solvent can vary widely, with quantities up to about 80 volume percent, on a volume/volume basis relative to the alcohol or polyol component, being suitable. Quantities of cosolvent up to about 60 volume percent, on a volume/volume basis relative to the alcohol or polyol component, are particularly preferred.

A co-solvent is desirable in some situations to aid the isolation of the desired product. In some cases, when no co-solvent is present in the solvent system, the desired product agglomerates in large chunks; the addition of co-solvent may prevent this agglomeration to produce a fine granular material.

The concentration of cellulose ester in the solvent system can vary widely. Preferred concentrations fall in the range of about 0.33 up to 20 percent, calculated as the weight of ester per volume of the solvent system; with concentrations in the range of about 1.5 up to 13 percent, calculated as the weight of ester per volume of solvent system being presently most preferred.

Solvolysis promoters contemplated for use in the practice of the present invention are selected from a wide variety of Lewis acids and include:
alkali metal compounds which are at least sparingly soluble in the reaction medium,
alkaline earth compounds which are at least sparingly soluble in the reaction medium,
Group IIIA compounds which are at least sparingly soluble in the reaction medium,
Group IVA compounds which are at least sparingly soluble in the reaction medium,
Group IIB compounds which are at least sparingly soluble in the reaction medium,
Group IIIB compounds which are at least sparingly soluble in the reaction medium,
Group IVB compounds which are at least sparingly soluble in the reaction medium,
Group VB compounds which are at least sparingly soluble in the reaction medium,
Group VIB compounds which are at least sparingly soluble in the reaction medium,
Group VIIB compounds which are at least sparingly soluble in the reaction medium, or
Group VIII compounds which are at least sparingly soluble in the reaction medium,
as well as mixtures of any two or more thereof.

Such metal compounds are typically selected from metal carboxylates, metal carbonates, metal oxides, metal carbonyls, or metal halides, as well as mixtures of any two or more thereof.

Exemplary alkali metal compounds are selected from lithium acetate, sodium molybdate, sodium carbonate, sodium fluoride, sodium acetate, potassium acetate, ruthenium acetate, or cesium acetate, as well as mixtures of two or more thereof.

Exemplary alkaline earth metal compounds are selected from beryllium acetylacetonate, magnesium acetate, magnesium chloride, magnesium molybdate, calcium formate, calcium chloride, calcium acetate, strontium acetate, or barium acetate, as well as mixtures of any two or more thereof.

Exemplary Group IIIA compounds are selected from gallium (III) acetylacetonate, gallium (III) acetate, or gallium (III) carbonate, as well as mixtures of any two or more thereof.

Exemplary Group IVA compounds are selected from dibutyltin oxide, stannous fluoride, stannous chloride, dibutyltin diacetate, diphenyltin oxide, tributyltin ether, or lead (II) acetate, as well as mixtures of any two or more thereof.

Exemplary Group IIB compounds are selected from zinc acetate or zinc chloride, as well as mixtures thereof.

Exemplary Group IIIB compounds are selected from yttrium (III) acetate or lanthanum (III) acetate, as well as mixtures thereof.

Exemplary Group IVB compounds are selected from titanium (IV) isopropoxide or zirconium (IV) acetate, as well as mixtures thereof.

Exemplary Group VB compounds are selected from vanadium (III) acetylacetonate.

Exemplary Group VIB compounds are selected from molybdenum (VI) oxide, molybdenum hexacarbonyl, molybdenum (II) acetate dimer, molybdenum (II) bromide, sodium molybdate, magnesium molybdate, tungsten tetrachloride, tungsten hexachloride, tungsten hexacarbonyl, or chromium (II) acetate, as well as mixtures of any two or more thereof.

Exemplary Group VIIB compounds are selected from manganese (II) acetate, manganese (II) chloride, or manganese (II) carbonate, as well as mixtures of any two or more thereof.

Exemplary Group VIII compounds are selected from iron (II) acetate, iron (III) acetate, cobalt (II) acetate, nickel (II) acetate, or palladium (II) acetate/triphenyl phosphine, as well as mixture of any two or more thereof.

The quantity of solvolysis promoter employed in the practice of the present invention can vary widely. Preferred quantities fall in the range of about 0.001 up to 10 mole percent, based on the moles of cellulose ester, with quantities in the range of about 0.03 up to 1.5 mole percent, based on the moles of cellulose ester, being presently most preferred.

Reaction conditions contemplated for use in the practice of the present invention can vary widely. The temperature used for the process of the present invention should be high enough to maintain substantial homogeneity of the reactants during the reaction. For example, reaction temperature can vary in the range of about 75° C. up to about 200° C., with temperatures in the range of about 130° C. up to about 180° C. being preferred. The presently most preferred temperature range for the practice of the present invention falls in the range of about 140° C. to 160° C.

The rate of heating of the reaction mixture to the desired reaction temperature is not so rapid as to cause a significant degree of charring of the starting ester of cellulose, and the reaction pressure is sufficient to maintain the components of said solvent system substantially in the liquid state at the desired reaction temperature.

Those of skill in the art readily recognize that contact times and reaction temperatures employed are interdependent, and thus can vary considerably. While the contact time may extend up to 48 hours at low reaction temperatures, when the reaction temperature is within the preferred range, the contact time will fall within the range of 0.5 to 16 hours. The presently most preferred contact time range is 1 to 7 hours.

The cellulose esters produced in the practice of the present invention are novel materials. Those of skill in the art recognize that esters with the same degree of substitution and having the same molecular weight may have different physical properties due to entirely different compositions. Analysis of the differences in composition between two cellulose esters can proceed at several levels. Two otherwise identical cellulose esters may differ in the relative degree of substitution (RDS) of the alkanoyl moieties between the 2-, 3-, and 6-oxygen positions of the anhydroglucose ring, for example. A further level of analysis would be the monomer composition of a single polymer chain. It is well known by those of skill in the art that hydrolysis of cellulose triacetate transforms a homopolymer into a copolymer consisting of two to eight different monomers (Goodlett, Dougherty, and Patton, *J. Polym. Sci.:* Part A-1, 1971, 9, 155). These monomers may be arranged in either a random, stereoregular, or block fashion along the polymer chain. Thus, an even higher level of sophistication of analysis would be the determination of the monomer sequence along the polymer chain.

Recent advances in nuclear magnetic resonance (NMR) spectroscopy have provided the tools necessary to distinguish between cellulose esters in the ways cited above. For example, recent reports by Buchanan, Hyatt, and Lowman (*Macromolecules.*, 1987, 20, 2750; *Carbohydrate Research*, 1988, 177, 228) provide methods by which the proton ($^1H$) and carbon-13 ($^{13}C$) NMR spectra of cellulose esters can be unambiguously assigned and from which structural information can be obtained. Differences in the RDS between two cellulose esters may be determined by $^{13}C$ NMR (Miyamoto, Sato, Shibata, and Inagaki, *J. Polym. Sci.: Polym. Chem. Ed.*, 1984, 22, 2363) or by $^1H$ NMR (Goodlett, Dougherty, and Patton, *J. Polym. Sci.:* Part A-1, 1971, 9, 155). Those skilled in the art recognize that the methods described by Buchanan et al. can be employed in the analysis of the monomer composition of less than fully substituted cellulose esters which, in connection with the present invention, would uniquely establish the composition of cellulose esters. The only additional requirement to these techniques is that cellulose acetate with carbon-13 labelling at the carbonyl carbons is required. This insures adequate sensitivity in the INAPT experiments (see Buchanan, Hyatt, Lowman, *Carbohydrate Research*, 1988, 177, 228).

It is also recognized by those of skill in the art that the resolution obtainable in the NMR spectra of cellulose esters can be substantially improved by the application of resolution enhancement techniques (Buchanan, Hyatt, and Lowman, *Macromolecules*, 1987, 20, 2750). In accordance with the present invention, application of NMR techniques cited above to the carbonyl carbon and methyl acetyl proton regions of the $^{13}C$ and $^1H$ NMR spectra, respectively, of a cellulose ester have been found to give characteristic NMR spectra that can be used to uniquely describe that cellulose ester whose uniqueness is due solely to the method of preparation. In nearly all cases, only a resolution enhanced $^{13}C$ NMR spectrum is needed to uniquely describe a particular cellulose acetate. The method of preparation of a cellulose acetate can be identified from a resolution enhanced $^{13}C$ NMR spectrum, for example. In this aspect, each preparation gives a material whose composition is unique to that process.

The invention will be described in greater detail by reference to the following non-limiting examples.

EXAMPLES

In the following examples, except where noted, the materials used were loaded into a 1-liter, steel Parr reactor equipped with a magnetically coupled agitator. The reactor was sealed, then heated to the contact temperature. The heat-up time was typically 1 to 2 hours. The initial pressure in the reactor was typically 200–500 psi nitrogen. The reaction mixture was stirred at the indicated temperature for the indicated reaction time. Then the reaction mixture was allowed to cool to room temperature, which typically took 2 to 3 hours. The products were isolated by filtration of the resulting slurry. The solvent and reactive solvent, as well as any cosolvents and certain by-products such as methyl acetate, typically could be recovered from the filtrate by distillation. The results in the examples indicate yields of isolated, well-characterized products. The products typically were characterized by titration, proton NMR spectroscopy, gel permeation chromatography, inherent viscosity, and other processes familiar to one well versed in the art.

Proton NMR data were obtained on either a JEOL Model GX-400 NMR spectrometer or a JEOL Model GX-270 NMR spectrometer operating at 400 MHz and 270 MHz, respectively. The sample tube size was 5 mm and the sample concentrations were 30 mg per ml of DMSO-$d_6$. One to two drops of trifluoroacetic acid (TFA) were added to the sample to shift residual water from the spectral region of interest. All proton NMR spectra were recorded at 80° C.

Carbon-13 NMR data were obtained on a JEOL Model GX-270 NMR spectrometer operating at 67.9 MHz. The sample concentration was 100 mg/ml (±0.01 mg) of DMSO-$d_6$. Three to fifty mg of Cr(AcAc)$_3$ was added to each sample as a relaxation agent. The sample tube size was 10 mm. Each carbon-13 NMR spectra was acquired at 80° C., the pulse delay was 1.0 sec, and 12,000 to 16,000 scans were used to acquire each spectrum. Each spectrum was collected with 32768 points and was zero filled to 65536 points to give a resolution of 0.52 Hz. Prior to integration of each spectrum, a 10th order polynomial baseline correction was applied. Carbon-13 chemical shifts are reported in ppm from tetramethylsilane with the center peak of DMSO-$d_6$ (39.5 ppm) as an internal reference. All NMR spectra were processed by using a 8 Mb Mac II Macintosh Computer, with Versa Term Pro as an emulation package and MacDraw II as a graphics package, interacting with Hare's FTNMR software (Hare Research, Inc., 14810 216th Ave., N.E., Woodinville, Wash. 98072) running on a VAX 8800 computer.

GPC data was acquired using a Waters Model 150C High Temperature Gel Permeation Chromatograph operating at 60° C. The mobile phase was DMF containing 0.5% LiBr. Sample size was 20-25 mg/10 ml and the injection size was 100 μl. Molecular weights are reported in polystyrene equivalents.

Inherent Viscosity was measured using a Schott Gerate AVS24 instrument operating at 25° C. Sample concentration was 0.25 g per 100 ml of DMSO.

EXAMPLE 1

Reagents set forth below were subjected to the standard procedure described above under the indicated reaction conditions. The results, in terms of identity and yield of the desired cellulose ester, and key analyses of the product, are also set forth below.

| Starting Cellulose Ester | Cellulose Diacetate (DS 2.45) |
|---|---|
| Weight (g) | 15.0 |
| Catalyst | Magnesium Acetate Tetrahydrate |
| Weight (g) | 0.26 |
| Reactive Solvent | Methanol |
| Weight (g) | 237.3 |
| Temperature (°C.) | 140 |
| Contact Time (h) | 4 |
| Product | Cellulose Monoacetate |
| Key Analyses | DS 0.41, IV (DMSO) 1.91, Absorbs about 10 times its weight in water |
| Yield (%) | 73.4 |

This example demonstrates that magnesium acetate is an effective catalyst for the solvolysis of cellulose esters. It also demonstrates that the process is effective for production of water-absorbent cellulose acetate in high yield.

$^{13}$C NMR spectrum of product acetyl region: see FIG. 1.

EXAMPLE 2

Reagents set forth below were subjected to the standard procedure described above under the indicated reaction conditions. The results, in terms of identity and yield of the desired cellulose ester, and key analyses of the product, are also set forth below.

| Starting Cellulose Ester | Cellulose Diacetate (DS 2.45) |
|---|---|
| Weight (g) | 60.0 |
| Catalyst | Magnesium Acetate Tetrahydrate |
| Weight (g) | 0.52 |
| Reactive Solvent | Methanol |
| Weight (g) | 427.1 |
| Cosolvent | 1-Methyl-2-pyrrolidone |
| Weight (g) | 61.98 |
| Temperature (°C.) | 155 |
| Contact Time (h) | 2 |
| Product | Cellulose Monoacetate |
| Key Analyses | DS 0.62, IV (DMSO) 1.78, GPC $M_w$ 200,000 $M_z/M_w$ 1.5, Absorbs about 10 times its weight in water |
| Yield (%) | 83.0 |

This example demonstrates the efficacy of the process using a cosolvent in the solvolysis of cellulose acetate.

EXAMPLE 3

Reagents set forth below were subjected to the standard procedure described above under the indicated reaction conditions. The results, in terms of identity and yield of the desired cellulose ester, and key analyses of the product, are also set forth below.

| Starting Cellulose Ester | Cellulose Diacetate (DS 2.45) |
|---|---|
| Weight (g) | 30.0 |
| Catalyst | Zinc Acetate Dihydrate |
| Weight (g) | 0.10 |
| Reactive Solvent | Methanol |
| Weight (g) | 237.3 |
| Temperature (°C.) | 140 |
| Contact Time (h) | 5 |
| Product | Cellulose Monoacetate |
| Key Analyses | DS 0.72, IV (DMSO) 1.70, Absorbs about 10 times its weight in water |
| Yield (%) | 75 |

This example demonstrates that zinc acetate is an effective catalyst for the solvolysis of cellulose esters. It also demonstrates that the catalyst is effective for production of water-absorbent cellulose acetate in high yield.

$^{13}$C NMR spectrum of product acetyl region: See FIG. 2.

EXAMPLE 4

Reagents set forth below were subjected to the standard procedure described above under the indicated reaction conditions. The results, in terms of identity and yield of the desired cellulose ester, and key analyses of the product, are also set forth below.

| Starting Cellulose Ester | Cellulose Diacetate (DS 2.45) |
|---|---|
| Weight (g) | 30.0 |
| Catalyst | Zinc Acetate Dihydrate |
| Weight (g) | 0.10 |
| Reactive Solvent | Methanol |
| Weight (g) | 237.3 |
| Temperature (°C.) | 155 |
| Contact Time (h) | 2 |
| Product | Cellulose Monoacetate |
| Key Analyses | DS 0.69, IV (DMSO) 1.63, GPC $M_w$ 800,000 $M_z/M_w$ 2, Absorbs about 10 times its weight in water |
| Yield (%) | 76 |

This example demonstrates that by using a slightly higher contact temperature, significantly shorter contact times are possible.

Figure 3:
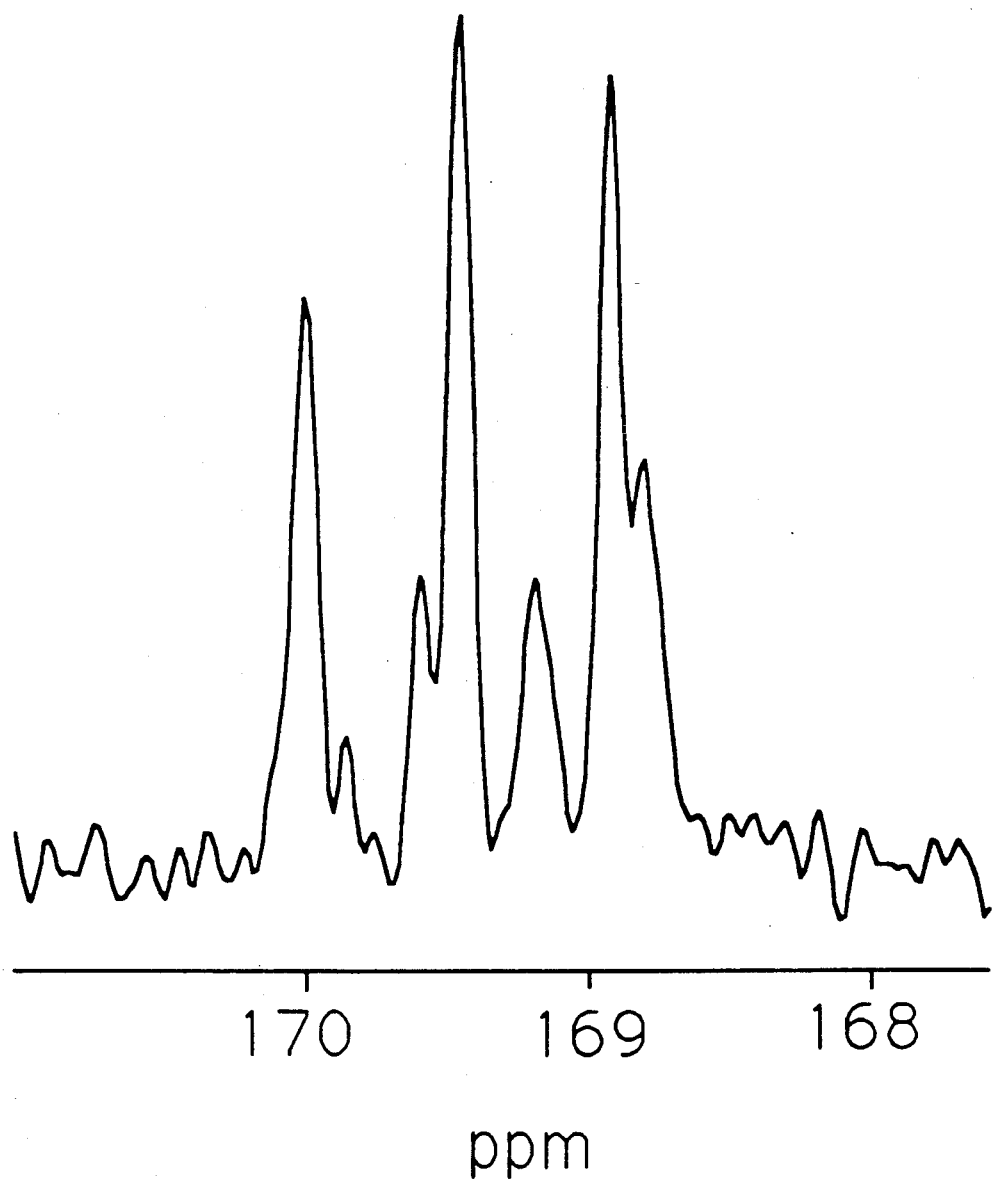
FIG. 3 is the carbon-13 NMR spectrum of the carbonyl carbons for Example 4.

$^{13}$C NMR spectrum of product acetyl region: see FIG. 3.

EXAMPLE 5

Reagents set forth below were subjected to the standard procedure described above under the indicated reaction conditions. The results, in terms of identity and yield of the desired cellulose ester, and key analyses of the product, are also set forth below.

| Starting Cellulose Ester | Cellulose Diacetate (DS 2.45) |
|---|---|
| Weight (g) | 30.0 |
| Catalyst | Zinc Chloride |
| Weight (g) | 0.06 |
| Reactive Solvent | Methanol |
| Weight (g) | 237.3 |
| Temperature (°C.) | 155 |
| Contact Time (h) | 3 |
| Product | Cellulose Monoacetate |
| Key Analyses | DS 0.64, IV (DMSO) 1.49, GPC $M_w$ 250,000 $M_z/M_w$ 1.7, Absorbs about 10 times its weight in water |
| Yield (%) | 90 |

This example demonstrates that zinc chloride is an effective catalyst for the solvolysis of cellulose esters. It also demonstrates that the catalyst is effective for production of water-absorbent cellulose acetate in high yield.

Figure 4:
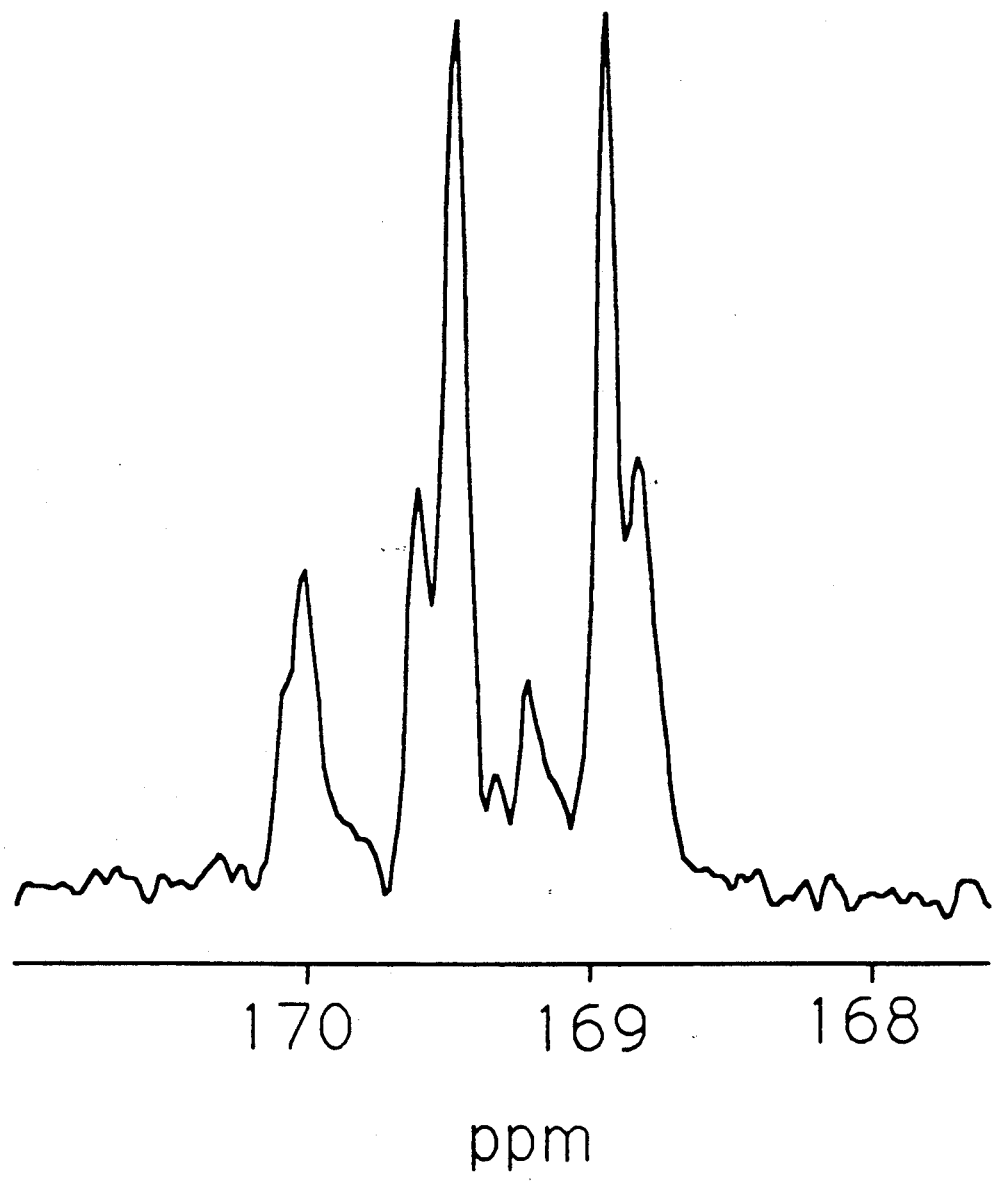
FIG. 4 is the carbon-13 NMR spectrum of the carbonyl carbons for Example 5.

$^{13}$C NMR spectrum of product acetyl region: see FIG. 4.

EXAMPLE 6

Reagents set forth below were subjected to the standard procedure described above under the indicated reaction conditions. The results, in terms of identity and yield of the desired cellulose ester, and key analyses of the product, are also set forth below.

| Starting Cellulose Ester | Cellulose Diacetate (DS 2.45) |
|---|---|
| Weight (g) | 30.0 |
| Catalyst | Molybdenum Carbonyl |
| Weight (g) | 0.08 |
| Reactive Solvent 1 | Methanol |
| Weight (g) | 213.6 |
| Reactive Solvent 2 | Water |
| Weight (g) | 30.0 |
| Temperature (°C.) | 140 |
| Contact Time (h) | 7 |
| Product | Cellulose Monoacetate |
| Key Analyses | DS 0.48, IV (DMSO) 0.55, Soluble in water |
| Yield (%) | 66 |

This example demonstrates that molybdenum carbonyl is an effective catalyst for the solvolysis of cellulose esters. It also demonstrates that the process is effective for production of water soluble cellulose acetate in high yield.

Figure 5:
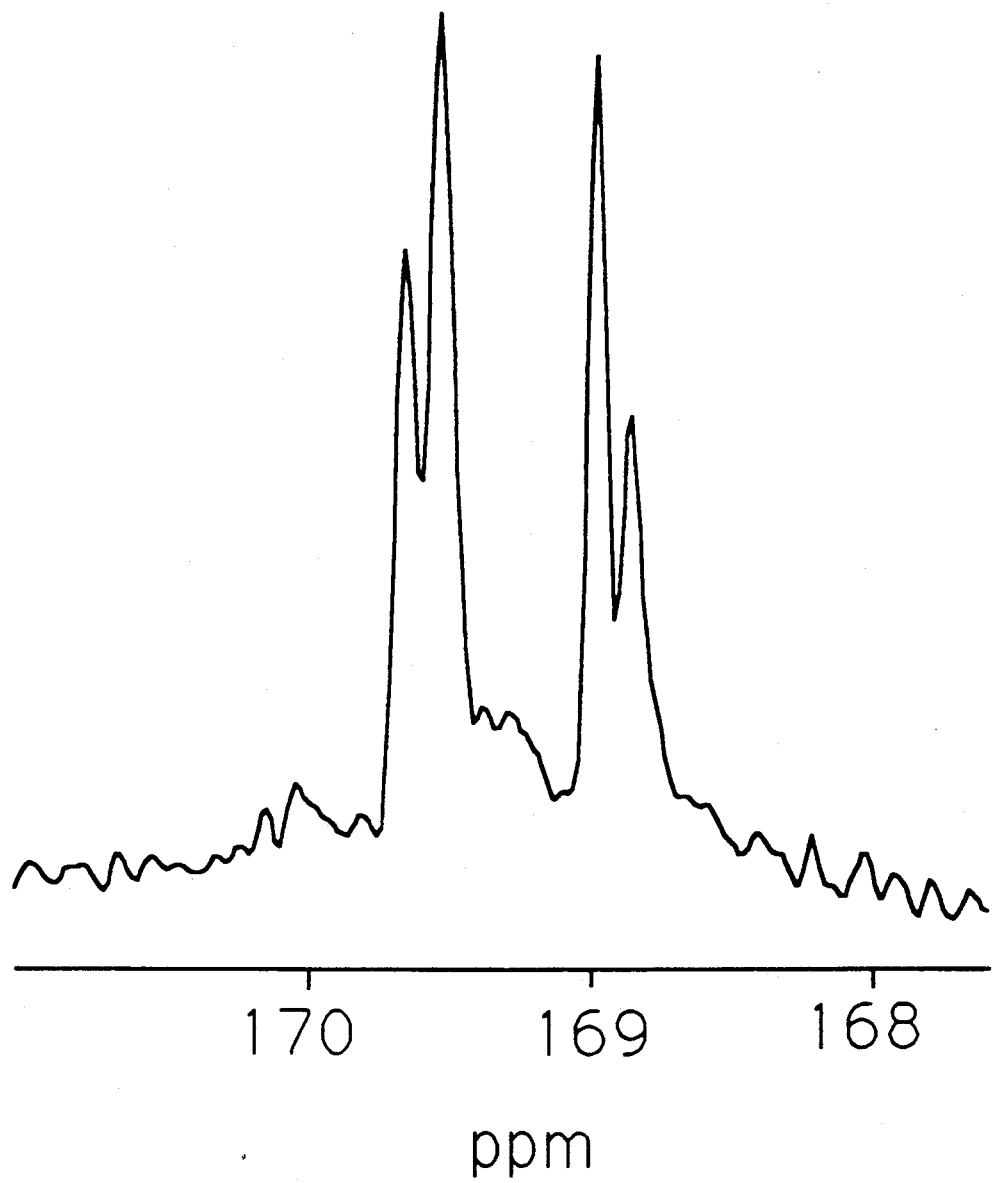
FIG. 5 is the carbon-13 NMR spectrum of the carbonyl carbons for Example 6.

$^{13}$C NMR spectrum of product acetyl region: see FIG. 5.

EXAMPLE 7

Reagents set forth below were subjected to the standard procedure described above under the indicated reaction conditions. The results, in terms of identity and yield of the desired cellulose ester, and key analyses of the product, are also set forth below.

| Starting Cellulose Ester | Cellulose Acetate Propionate (DS Acetyl 0.18, Propionyl 2.34) |
|---|---|
| Weight (g) | 25.0 |
| Catalyst | Molybdenum Carbonyl |
| Weight (g) | 0.13 |
| Reactive Solvent | Methanol |
| Weight (g) | 395.5 |
| Temperature (°C.) | 140 |
| Contact Time (h) | 4 |
| Product | Cellulose Monopropionate |
| Key Analyses | DS Acetyl 0.00, Propionyl 0.58, IV (DMSO) 0.85 |
| Yield (%) | 99.0 |

This example differs from the standard procedure in the following way: the reaction was carried out in a 1-liter, jacketed glass reactor capable of withstanding pressures of up to approximately 150 psig, equipped with a magnetically coupled agitator. The reactor was heated by the circulation of hot oil through the jacket. The initial pressure was 50-70 psig. The product was isolated in this case by addition of the reaction mixture to water, followed by filtration.

This example demonstrates the preparation of cellulose monopropionate by solvolysis of cellulose acetate propionate.

EXAMPLE 8

Reagents set forth below were subjected to the standard procedure described above under the indicated reaction conditions. The results, in terms of identity and yield of the desired cellulose ester, and key analyses of the product, are also set forth below.

| Starting Cellulose Ester | Cellulose Diacetate (DS 2.45) |
|---|---|
| Weight (g) | 30.0 |
| Catalyst | Molybdenum (VI) Oxide |
| Weight (g) | 0.05 |
| Reactive Solvent | Methanol |
| Weight (g) | 237.3 |
| Temperature (°C.) | 155 |
| Contact Time (h) | 3 |
| Product | Cellulose Monoacetate |
| Key Analyses | DS 0.50, IV (DMSO) 1.16, Soluble in water |
| Yield (%) | 87 |

This example demonstrates that molybdenum (III) oxide is an effective catalyst for the solvolysis of cellulose esters. It also demonstrates that the catalyst is effective for production of water soluble cellulose acetate in high yield.

Figure 6:
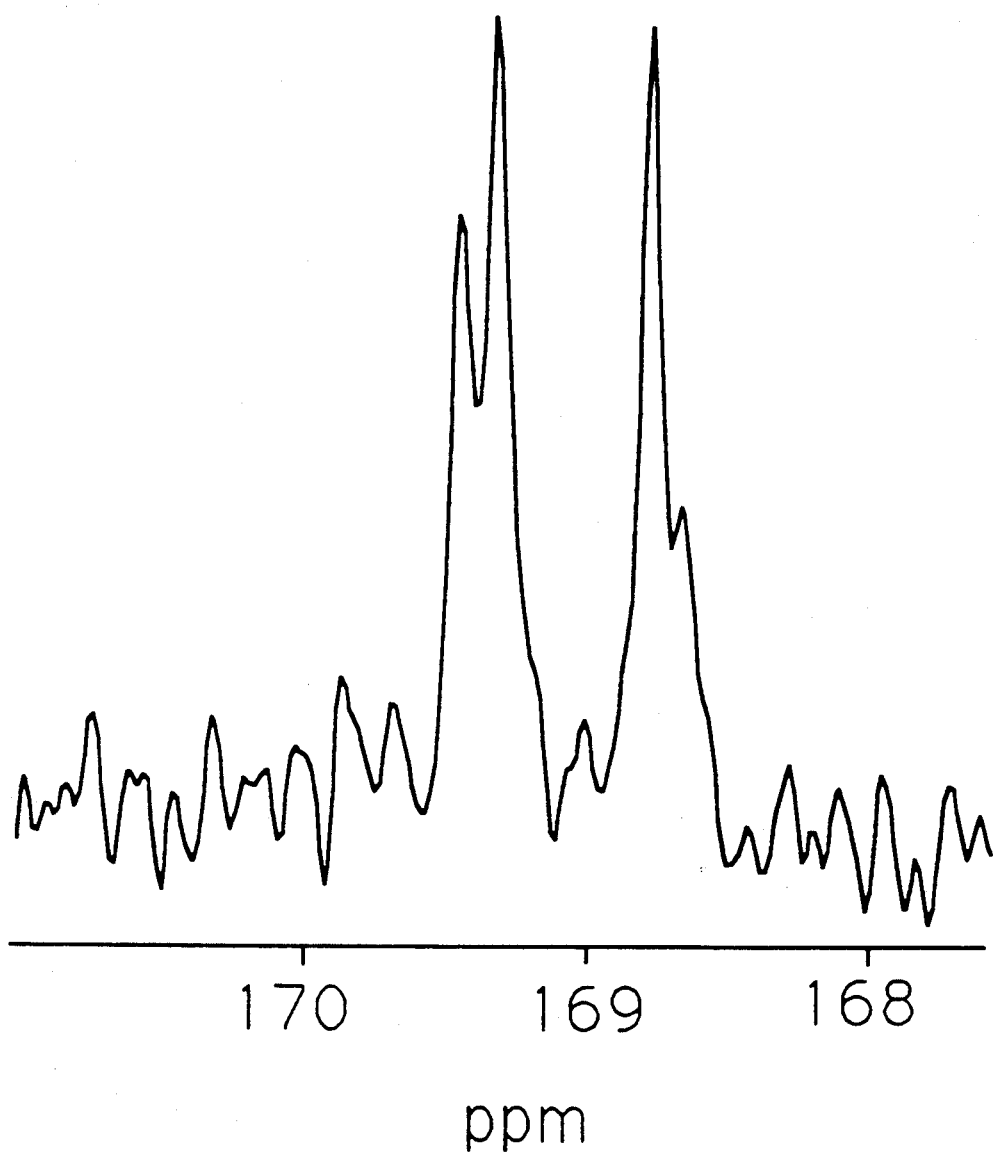
FIG. 6 is the carbon-13 NMR spectrum of the carbonyl carbons for Example 8.

$^{13}$C NMR spectrum of product acetyl region: see FIG. 6.

EXAMPLE 9

Reagents set forth below were subjected to the standard procedure described above under the indicated reaction conditions. The results, in terms of identity and yield of the desired cellulose ester, and key analyses of the product, are also set forth below.

| Starting Cellulose Ester | Cellulose Diacetate (DS 2.45) |
|---|---|
| Weight (g) | 60.0 |
| Catalyst | Dibutyltin Oxide |
| Weight (g) | 0.20 |
| Reactive Solvent | Methanol |
| Weight (g) | 237.3 |
| Temperture (°C.) | 155 |
| Contact Time (h) | 3 |
| Product | Cellulose Monoacetate |
| Key Analyses | DS 0.62, IV (DMSO) 1.47, |

| | |
|---|---|
| | Absorbs about 10 times its weight in water |
| Yield (%) | 86 |

This example demonstrates that dibutyltin oxide is an effective catalyst for the solvolysis of cellulose esters. It also demonstrates that the catalyst is effective for production of water-absorbent cellulose acetate in high yield.

Figure 7:
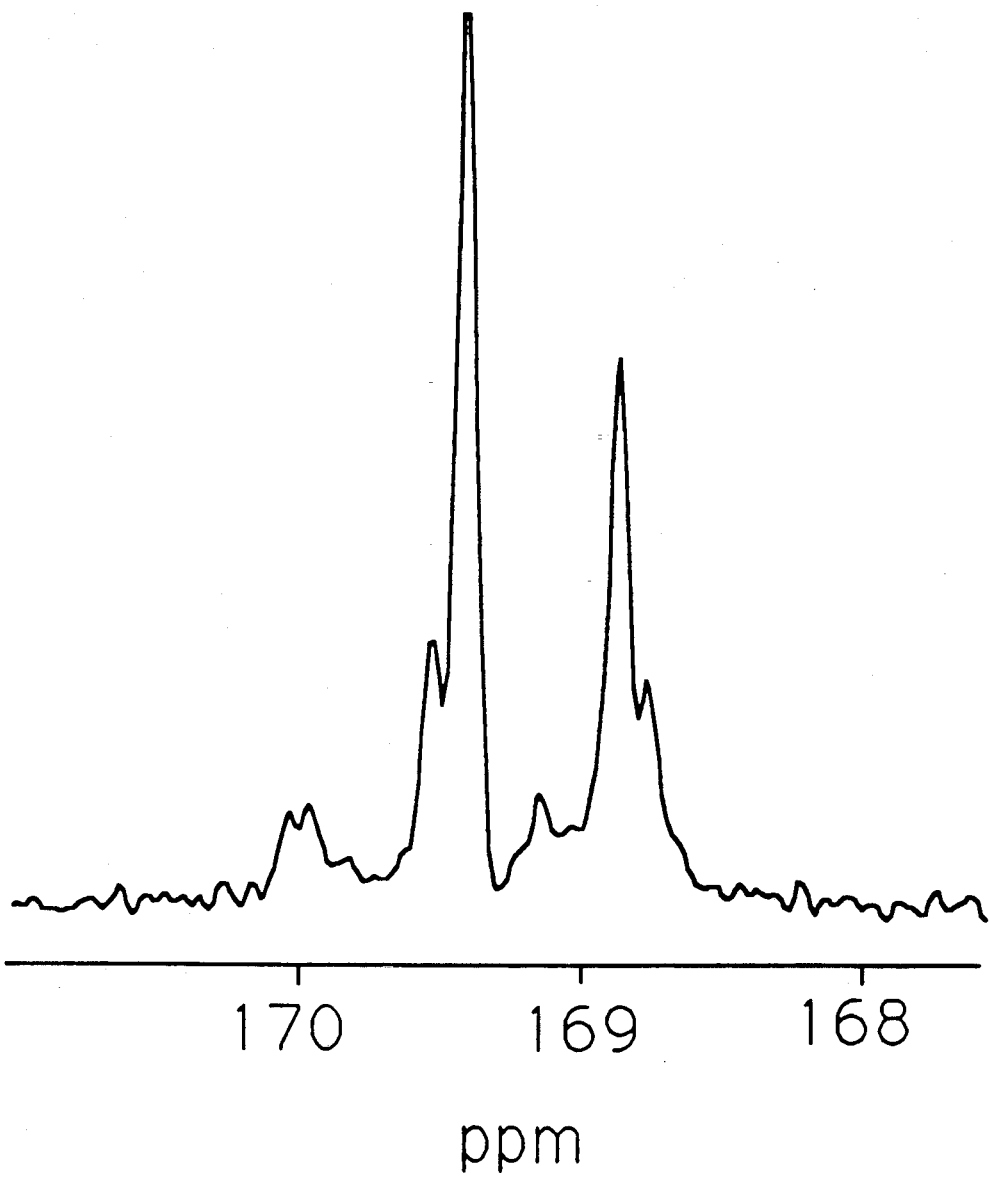
FIG. 7 is the carbon-13 NMR spectrum of the carbonyl carbons for Example 9.

$^{13}C$ NMR spectrum of product acetyl region: see FIG. 7.

EXAMPLE 10

Reagents set forth below were subjected to the standard procedure described above under the indicated reaction conditions. The results, in terms of identity and yield of the desired cellulose ester, and key analyses of the product, are also set forth below.

| | |
|---|---|
| Starting Cellulose Ester | Cellulose Triacetate (DS 2.89) |
| Weight (g) | 30.0 |
| Catalyst | Dibutyltin Oxide |
| Weight (g) | 0.10 |
| Reactive Solvent | Methanol |
| Weight (g) | 237.3 |
| Temperture (°C.) | 175 |
| Contact Time (h) | 3 |
| Product | Cellulose Monoacetate |
| Key Analyses | DS 0.58, IV (DMSO) 1.49, Absorbs about 10 times its weight in water |
| Yield (%) | 66 |

This example demonstrates the use of cellulose triacetate as the starting material for the solvolysis of cellulose esters.

EXAMPLE 11

Reagents set forth below were subjected to the standard procedure described above under the indicated reaction conditions. The results, in terms of identity and yield of the desired cellulose ester, and key analyses of the product are also set forth below.

| | |
|---|---|
| Starting Cellulose Ester | Cellulose Acetate Propionate (DS Acetyl 0.18, Propionyl 2.34) |
| Weight (g) | 25.0 |
| Catalyst | Dibutyltin Oxide |
| Weight (g) | 0.16 |
| Reactive Solvent | Methanol |
| Weight (g) | 395.5 |
| Temperature (°C.) | 140 |
| Contact Time (h) | 4.5 |
| Product | Cellulose Acetate Propionate |
| Key Analyses | DS Acetyl 0.04, Propionyl 0.85, IV (DMSO) 2.09 |
| Yield (%) | 89 |

This example differs from the standard procedure in the following way: the reaction was carried out in a 1-liter, jacketed glass reactor capable of withstanding pressures of up to approximately 150 psig, equipped with a magnetically coupled agitator. The reactor was heated by the circulation of hot oil through the jacket. The initial pressure was 50-70 psig. The product was isolated in this case by addition of the reaction mixture to water, followed by filtration.

This example demonstrates the synthesis of low-DS cellulose acetate propionate by our process for the solvolysis of cellulose esters.

EXAMPLE 12

Reagents set forth below were subjected to the standard procedure described above under the indicated reaction conditions. The results, in terms of identity and yield of the desired cellulose ester, and key analyses of the product, are also set forth below.

| | |
|---|---|
| Starting Cellulose Ester | Cellulose Acetate Butyrate (DS Acetyl 1.00, Butyryl 1.69) |
| Weight (g) | 50.0 |
| Catalyst | Dibutyltin Oxide |
| Weight (g) | 0.32 |
| Reactive Solvent | Methanol |
| Weight (g) | 395.5 |
| Temperature (°C.) | 140 |
| Contact Time (h) | 5 |
| Product | Cellulose Acetate Butyrate |
| Key Analyses | DS Acetyl 0.13, Butyryl 0.64, IV (DMSO) 2.06 |
| Yield (%) | 74 |

This example differs from the standard procedure in the following way: the reaction was carried out in a 1-liter, jacketed glass reactor capable of withstanding pressures of up to approximately 150 psig, equipped with a magnetically coupled agitator. The reactor was heated by the circulation of hot oil through the jacket. The initial pressure was 50-70 psig. The product was isolated in this case by addition of the reaction mixture to water, followed by filtration.

This example demonstrates the use of cellulose acetate butyrate as the starting material for the solvolysis of cellulose esters.

EXAMPLE 13 (Comparative)

The reagents set forth below were subjected to the standard procedure described above, modified as indicated below, under the indicated reaction conditions. The results, in terms of identity and yield of the desired cellulose ester, and key analyses of the product, are also set forth below.

| | |
|---|---|
| Starting Cellulose Ester | Cellulose Triacetate |
| Weight (parts) | 125 |
| Catalyst | Sulfuric Acid |
| Solvent | Acetic Acid |
| Weight (parts) | 728 |
| Reactive Solvent | Water |
| Weight (parts) | 479 |
| Temperature (°C.) | 82 |
| Contact Time (h) | 70 |
| Product | Cellulose Monoacetate |
| Key Analyses | DS 0.77, IV (DMSO) 1.21, GPC $M_w$ 2.8 × $10^5$, $M_n$ 1.0 × $10^5$ |

This example differs from the standard procedure in the following way: the reaction was run in a mechanically stirred steel reactor. The product was isolated by pouring the reaction mixture into isopropyl alcohol, followed by filtration.

This example demonstrates the long reaction times and high dilution of the conventional process, as well as the characteristics of the product made by the conventional process.

Figure 8:
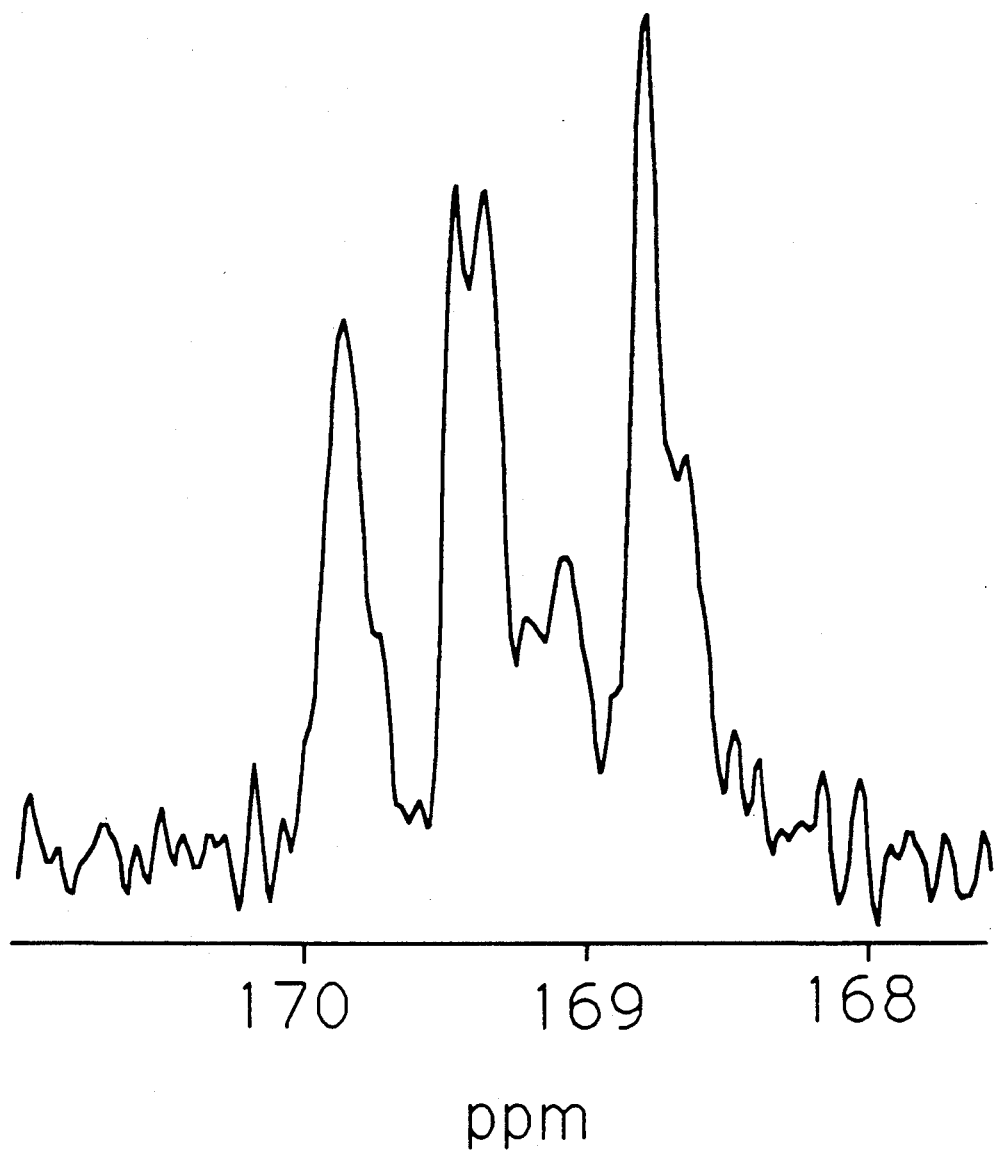
FIG. 8 is the carbon-13 NMR spectrum of the carbonyl carbons for Example 13.

$^{13}$C NMR spectrum of product acetyl region: see FIG. 8.

The following Tables I–V summarize certain data from the foregoing examples. In these tables the various abbreviations and symbols used have the following meanings: "CE" is cellulose ester; "CA" is cellulose acetate; "CAP" is cellulose acetate propionate; "CTA" is cellulose triacetate; "CAB" is cellulose acetate butyrate; "psi" is pounds per square inch; "min" is minute; "h" is hour; "RDS" is relative degree of substitution; "DS" is degree of substitution; "C6" is the C6 ring carbon; "C3" is the C3 ring carbon; "C2" is the C2 ring carbon; "DMSO" is dimethylsulfoxide; "DMF" is dimethylformamide; "$M_n$" is number average molecular weight; "$M_w$" is weight average molecular weight; "$M_z$" is Z average molecular weight; "GPC" is gel permeation chromatography; "6-tri" is the 6-carbonyl in the tri-substituted monomer; "3-m" is the 3-carbonyl in the 3-monosubstituted monomer; "2,3-di" is the 2-carbonyl in the 2,3-disubstituted monomer; "3,6-di" is the 3-carbonyl in the 3,6-disubstituted monomer; "3-tri" is the 3-carbonyl in the tri-substituted monomer; "2,3-di" is the 3-carbonyl in the 2,3-disubstituted monomer; "2-tri" is the 2-carbonyl in the trisubstituted monomer; and "2-m" is the 2-carbonyl in the 2-monosubstituted monomer.

TABLE I

Conditions for the Preparation of Cellulose Esters Given in Examples 1–13

| Example | Starting CE | Solvolysis Promoter | Temperature (°C.) | Pressure (psi N$_2$) | Heatup Time (min) | Contact Time (h) | Yield % |
|---|---|---|---|---|---|---|---|
| 1 | CA | Mg(OAc)$_3$ | 140 | 200 | 150 | 4 | 73 |
| 2 | CA | Mg(OAc)$_3$ | 155 | 200 | 180 | 2 | 83 |
| 3 | CA | Zn(OAc)$_3$ | 140 | 200 | 80 | 5 | 75 |
| 4 | CA | Zn(OAc)$_3$ | 155 | 1000 | 45 | 2 | 76 |
| 5 | CA | ZnCl$_2$ | 155 | 500 | 75 | 3 | 90 |
| 6 | CA | MoCO$_6$ | 140 | 200 | 75 | 7 | 66 |
| 7 | CAP | MoCO$_6$ | 140 | 40 | 46 | 4 | 99 |
| 8 | CA | MoO$_2$ | 155 | 1000 | 70 | 3 | 87 |
| 9 | CA | Bu$_2$SnO | 155 | 1000 | 120 | 3 | 86 |
| 10 | CTA | Bu$_2$SnO | 175 | 1000 | 90 | 3 | 66 |
| 11 | CAP | Bu$_2$SnO | 150 | 50 | 80 | 4.5 | 89 |
| 12 | CAB | Bu$_2$SnO | 140 | 40 | 60 | 5 | 74 |
| 13 | CTA | H$^+$/H$_2$O | 82 | — | — | 70 | — |

TABLE II

DS, RDS, IV, and GPC for Selected Cellulose Monoacetates

| Examples | Solvolysis Promoter | DS | RDS (Carbonyl) C6 | C3 | C2 | RDS (Ring) C6 | C3 | C2 | IV (DMSO) | GPC (× 10$^5$, LiBr/DMF) M$_n$ | M$_w$ | M$_z$ | M$_w$/M$_n$ |
|---|---|---|---|---|---|---|---|---|---|---|---|---|---|
| Absorbs Water | | | | | | | | | | | | | |
| 1 | Mg(OAc)$_3$ | 0.40 | 0.12 | 0.16 | 0.13 | 0.13 | 0.13 | 0.13 | 1.91 | 2.4 | 2.8 | 3.3 | 1.2 |
| 3 | Zn(OAc)$_3$ | 0.72 | 0.14 | 0.33 | 0.25 | 0.18 | 0.30 | 0.24 | 1.70 | 1.2 | 2.3 | 3.8 | 1.9 |
| 4 | Zn(OAc)$_3$ | 0.69 | 0.15 | 0.29 | 0.25 | 0.14 | 0.30 | 0.25 | 1.63 | 1.4 | 2.6 | 4.3 | 1.9 |
| 5 | ZnCl$_2$ | 0.64 | 0.10 | 0.30 | 0.24 | 0.10 | 0.27 | 0.27 | 1.49 | 1.2 | 2.5 | 4.4 | 2.1 |
| 9 | Bu$_2$SnO | 0.62 | 0.10 | 0.34 | 0.22 | 0.11 | 0.28 | 0.23 | 1.47 | 1.1 | 2.5 | 4.5 | 2.3 |
| Water Soluble | | | | | | | | | | | | | |
| 6 | MoCO$_6$ | 0.48 | 0.03 | 0.28 | 0.17 | 0.04 | 0.28 | 0.16 | 0.55 | 0.4 | 0.8 | 1.2 | 2.0 |
| 8 | MoO$_2$ | 0.50 | 0.00 | 0.27 | 0.24 | 0.00 | 0.25 | 0.25 | 1.16 | 0.7 | 1.6 | 3.0 | 2.3 |
| 13 | H$^+$/H$_2$O | 0.77 | 0.17 | 0.34 | 0.25 | 0.16 | 0.33 | 0.28 | 1.21 | 1.1 | 1.8 | 2.5 | 1.6 |

TABLE III

Carbon-13 NMR Chemical Shifts for Selected Cellulose Monoacetates

Chemical Shifts$^a$

| Ex. | C6 | 6-tri | C6 | C6 | 3-m* | 3-m | 2,3-di* | 2,3-di | 3,6-di* | 3,6-di | 3-tri* | 3-tri | 2,3-di | 2-tri | 2-m 2,6-di |
|---|---|---|---|---|---|---|---|---|---|---|---|---|---|---|---|
| (b) | 170.03 | 169.94 | 169.87 | 169.79 | 169.55 | 169.52 | 169.44 | 169.39 | 169.26 | 169.19 | 169.14 | 169.10 | 168.85 | 168.73 | 168.63 |
| 1 | — | 169.97 | — | 169.80 | — | — | — | 169.41 | — | — | 169.13 | — | 168.85 | — | 168.65 |
| 3 | 170.03 | 169.97 | — | 169.81 | 169.55 | — | — | 169.41 | 169.25 | — | 169.15 | — | 168.86 | 168.76 | — |
| 4 | — | 169.97 | — | 169.82 | 169.55 | — | — | 169.41 | — | — | 169.14 | — | 168.86 | 168.76 | — |
| 5 | 170.02 | 169.97 | — | — | 169.54 | — | — | 169.41 | 169.25 | — | 169.14 | — | 168.85 | 168.75 | — |
| 6 | — | 169.96 | — | — | 169.55 | — | 169.43 | — | 169.26 | — | 169.15 | — | 168.86 | 168.75 | — |
| 8 | — | — | — | — | 169.55 | — | 169.42 | — | — | — | — | — | 168.85 | 168.75 | — |
| 9 | 170.02 | 169.95 | — | 169.80 | — | 169.52 | — | 169.38 | — | — | 169.12 | — | 168.83 | 168.72 | — |
| 13 | — | 169.93 | — | 169.80 | — | 169.52 | — | 169.41 | 169.24 | — | 169.12 | — | 168.83 | 168.67 | — |

$^a$Underlining indicates the acetyl of a diacetyl monomer
*Indicates hydrogen bonding acetyl
(b) Chemicals shifts and peak assignments were determined by the processes of Buchanan, Hyatt, Lowman (Macromolecules 1987, 20, 2750; Carbohydrate Research 1988, 177, 228)

TABLE IV

Carbonyl Peak Areas For Selected Cellulose Monoacetates

| | C6 | 6-tri | C6 | C6 | 3-m* | 3-m | 2,3-di* | 2,3-di | 3,6-di* | 3,6-di | 3-tri* | 3-tri | 2,3-di | 2-tri | 2-m 2,6-di |
|---|---|---|---|---|---|---|---|---|---|---|---|---|---|---|---|
| Absorbs Water | | | | | | | | | | | | | | | |
| | 170.03 | 169.94 | 169.87 | 169.79 | 169.55 | 169.52 | 169.44 | 169.39 | 169.26 | 169.19 | 169.14 | 169.10 | 168.85 | 168.73 | 168.63 |
| 1 | — | 26.8 | — | 2.7 | — | — | — | 28.6 | — | — | 9.8 | — | 28.6 | — | 3.6 |
| 3 | 3.7 | 12.0 | — | 2.8 | 11.1 | — | — | 24.1 | 1.9 | — | 9.3 | — | 20.4 | 14.8 | — |
| 4 | — | 19.4 | — | 2.8 | 5.6 | — | — | 25.0 | — | — | 12.0 | — | 21.3 | 13.8 | — |
| 5 | 2.7 | 12.7 | — | — | 8.2 | — | — | 27.3 | 2.7 | — | 8.2 | — | 20.9 | 17.3 | — |
| 9 | 3.9 | 3.9 | — | 2.9 | 10.6 | — | — | 37.5 | — | — | 6.7 | — | 24.0 | 10.6 | — |
| Water Soluble | | | | | | | | | | | | | | | |
| 6 | — | 6.5 | — | — | 20.4 | — | 23.7 | — | 4.3 | — | 8.6 | — | 19.4 | 17.2 | — |
| 8 | — | — | — | — | 19.0 | — | 35.0 | — | — | — | — | — | 29.0 | 17.0 | — |
| 13 | — | 19.4 | — | 2.8 | 14.8 | — | 14.8 | — | 4.6 | — | 10.2 | — | 21.3 | — | 12.0 |

TABLE V

Percent Water Solubility and Area Ratio of 3 Acetyls for Selected Cellulose Monoacetates

| | 3-m/2,3-di | 3-m/3-tri | 3-m/total 3 acetyl | 3-m/DS | Water Solubility (%) | Water Absorption (%) |
|---|---|---|---|---|---|---|
| Absorbs Water | | | | | | |
| 1 | 0.00 | 0.00 | 0.00 | 0.00 | — | 1016 |
| 3 | 0.46 | 1.19 | 0.24 | 0.11 | — | 958 |
| 4 | 0.22 | 0.47 | 0.13 | 0.06 | — | 1137 |
| 5 | 0.30 | 1.00 | 0.18 | 0.08 | — | 945 |
| 9 | 0.28 | 1.58 | 0.19 | 0.11 | — | 713 |
| Water Soluble | | | | | | |
| 6 | 0.86 | 2.37 | 0.36 | 0.20 | 93 | — |
| 8 | 0.54 | ∞ | 0.35 | 0.19 | 100 | — |
| 13 | 1.00 | 1.45 | 0.33 | 0.15 | 100 | — |

The invention has been described in detail with particular reference to preferred embodiments thereof, but it will be understood that variations and modifications can be effected within the spirit and scope of the invention.

We claim:

1. A process for reducing the degree of substitution of $C_1-C_{20}$ esters of cellulose, said process comprising contacting at least one of said esters of cellulose with:

a solvent system comprising
   (a) at least one alcohol or polyol having up to 4 carbon atoms, and optionally,
   (b) at least one co-solvent selected from: water; 1,4-dioxane; tetrahydrofuran; 1-methyl-2-pyrrolidinone; N,N-dimethylformamide; N,N-dimethylacetamide; ketones having in the range of 3 up to 12 carbon atoms; and poly-oxygenated compounds having the structural formula:

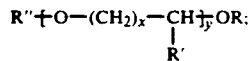

$$R''{+}O-(CH_2)_x-CH{+}_y OR;$$
$$\quad\quad\quad\quad\quad\quad | \atop R'$$

wherein R is an alkyl group having up to 10 carbon atoms, R' is H or an alkyl group having up to 10 carbon atoms, R" is H or an alkyl group having up to 10 carbon atoms, x can vary from 1 up to 6 and y can vary from 1 up to 6; and (ii) an effective amount of at least one solvolysis promoter selected from:
   alkali metal compounds which are at least sparingly soluble in the reaction medium,
   alkaline earth compounds which are at least sparingly soluble in the reaction medium,
   Group IIIA compounds which are at least sparingly soluble in the reaction medium,
   Group IVA compounds which are at least sparingly soluble in the reaction medium,
   Group IIB compounds which are at least sparingly soluble in the reaction medium,
   Group IIIB compounds which are at least sparingly soluble in the reaction medium,
   Group IVB compounds which are at least sparingly soluble in the reaction medium,
   Group VB compounds which are at least sparingly soluble in the reaction medium,
   Group VIB compounds which are at least sparingly soluble in the reaction medium,
   Group VIIB compounds which are at least sparingly soluble in the reaction medium, or
   Group VIII compounds which are at least sparingly soluble in the reaction medium,
   as well as mixtures of any two or more thereof, wherein said contacting is carried out for a reaction time in the range of about 0.1 up to 48 hours, and a reaction temperature in the range of about 75° C. up to 200° C.

2. A process in accordance with claim 1 wherein the starting ester of cellulose has a degree of substitution falling in the range of about 2 up to 3.

3. A process in accordance with claim 1 wherein the starting ester of cellulose has a degree of substitution falling in the range of about 2.4 up to 2.6.

4. A process in accordance with claim 1 wherein the starting ester of cellulose is cellulose acetate, cellulose propionate, cellulose butyrate, cellulose acetate propionate, or cellulose acetate butyrate.

5. A process in accordance with claim 1 wherein the product cellulose ester has a degree of substitution at least 0.1 lower than the starting cellulose ester, and an inherent viscosity, as measured at a temperature of 25°

C. for a 0.25 gram sample in 100 ml of dimethylsulfoxide, of at least about 0.1 deciliter/gram.

6. A process in accordance with claim 1 wherein the product cellulose ester has a degree of substitution of about 0.4 to about 1.2, and an inherent viscosity, as measured at a temperature of 25° C. for a 0.25 gram sample in 100 ml of dimethylsulfoxide, of about 0.1 to about 2.5 deciliters/gram.

7. A process in accordance with claim 6 wherein the degree of substitution of the product cellulose ester is about 0.4 to about 0.8.

8. A process in accordance with claim 1 wherein said ketone co-solvent is selected from: acetone, 2-butanone, 2-pentanone, or 4-methyl-2-pentanone, as well as mixtures of any two or more thereof.

9. A process in accordance with claim 1 wherein said poly-oxygenated compound is selected from: glyme, diglyme, ethylene glycol monomethyl ether, ethylene glycol monoethyl ether, ethylene glycol monopropyl ether, ethylene glycol monobutyl ether, propylene glycol monomethyl ether, propylene glycol monoethyl ether, propylene glycol monopropyl ether, or propylene glycol monobutyl ether, as well as mixtures of any two or more thereof.

10. A process in accordance with claim 1 wherein said solvent system comprises methanol.

11. A process in accordance with claim 6 wherein said solvent system further comprises water.

12. A process in accordance with claim 6 wherein said solvent system further comprises 1-methyl-2-pyrrolidinone.

13. A process in accordance with claim 1 wherein at least one solvolysis promoter is selected from metal carboxylates, metal carbonates, metal oxides, metal carbonyls, or metal halides, exclusive of the fluorides, as well as mixtures of any two or more thereof.

14. A process in accordance with claim 1 wherein at least one solvolysis promoter is selected from alkali metal compounds which are at least sparingly soluble in the reaction medium.

15. A process in accordance with claim 14 wherein said alkali metal compounds are selected from: lithium acetate, sodium molybdate, sodium carbonate, sodium acetate, sodium fluoride, potassium acetate, rubidium acetate, or cesium acetate, as well as mixtures of any two or more thereof.

16. A process in accordance with claim 1 wherein at least one solvolysis promoter is selected from alkaline earth compounds which are at least sparingly soluble in the reaction medium.

17. A process in accordance with claim 16 wherein said alkaline earth metal compounds are selected from: beryllium acetylacetonate, magnesium acetate, magnesium chloride, magnesium molybdate, calcium formate, calcium chloride, calcium acetate, strontium acetate, or barium acetate, as well as mixtures of any two or more thereof.

18. A process in accordance with claim 17 wherein said alkaline earth metal compound is magnesium acetate.

19. A process in accordance with claim 18 wherein the product is a water absorbent cellulose acetate which has:
(i) a degree of substitution falling in the range of 0.4 up to 1.2,
(ii) an inherent viscosity, measured at a temperature of 25° C. for a 0.25 gram sample in 100 mL of DMSO, in the range of about 0.1 up to 2.5 deciliters/gram, and
(iii) a ratio in the carbon-13 nuclear magnetic resonance spectrum of said composition for the area of the acetyl carbonyl carbon resonances appearing at 169.56 to 169.51 ppm, relative to tetramethylsilane, to the area of the acetyl carbonyl carbon resonances appearing at 169.45 to 169.37 ppm, of less than about 0.5, a ratio of the area of the acetyl carbonyl carbon resonances appearing at 169.56 to 169.51 ppm, relative to tetramethylsilane, to the area of the acetyl carbonyl carbon resonances appearing at 169.16 to 169.05 ppm, of less than about 1.1, a ratio of the area of the acetyl carbonyl carbon resonances appearing at 169.56 to 169.51 ppm, relative to tetramethylsilane, to the area of the acetyl carbonyl carbon resonances appearing at 169.56 to 169.05 ppm, of less than about 0.25, and a ratio of the amount of acetyl carbonyl carbon resonances appearing between 169.56 and 169.51 ppm to total degree of substitution of less than about 0.11, wherein the carbon-13 nuclear magnetic resonance spectrum is obtained at 67.9 MHz and about 80° C. for a solution of cellulose ester in DMSO-$d_6$, said sample having a concentration of about 100 mg of cellulose ester per mL of DMSO-$d_6$ and in the range of about 3 up to 50 mg of chromium (III) acetylacetonate per 300 mg of cellulose acetate.

20. A process in accordance with claim 1 wherein at least one solvolysis promoter is selected from Group IIIA compounds which are at least sparingly soluble in the reaction medium.

21. A process in accordance with claim 20 wherein said Group IIIA compounds are selected from: gallium (III) acetylacetonate, gallium (III) acetate, or gallium (III) carbonate, as well as mixtures of any two or more thereof.

22. A process in accordance with claim 20 wherein said Group IIIA compound is gallium (III) acetylacetonate.

23. A process in accordance with claim 1 wherein at least one solvolysis promoter is selected from Group IVA compounds which are at least sparingly soluble in the reaction medium.

24. A process in accordance with claim 23 wherein said Group IVA compounds are selected from: dibutyltin oxide, stannous fluoride, stannous chloride, dibutyltin diacetate, diphenyltin oxide, tributyltin ether, or lead (II) acetate, as well as mixtures of any two or more thereof.

25. A process in accordance with claim 23 wherein said Group IVA compound is dibutyltin oxide.

26. A process in accordance with claim 25 wherein the product is a water absorbent cellulose acetate which has:
(i) a degree of substitution falling in the range of 0.4 up to 1.2,
(ii) an inherent viscosity, measured at a temperature of 25° C. for a 0.25 gram sample in 100 mL of DMSO, in the range of about 0.1 up to 2.5 deciliters/gram, and
(iii) a ratio in the carbon-13 nuclear magnetic resonance spectrum of said composition of the area of the acetyl carbonyl carbon resonances appearing at 169.56 to 169.51 ppm, relative to tetramethylsilane, to the area of the acetyl carbonyl carbon resonances appearing at 169.45 to 169.37 ppm, of less than about 0.5, a ratio of the area of the acetyl carbonyl carbon resonances appearing at 169.56 to 169.51 ppm, relative to tetramethylsilane, to the area of the acetyl carbonyl carbon resonances appearing at 169.16 to 169.05 ppm, of less than about 1.6, a ratio of the area of the acetyl carbonyl carbon resonances appearing at 169.56 to 169.51 ppm, relative to tetramethylsilane, to the area of the acetyl carbonyl carbon resonances appearing at 169.56 to 169.05 ppm of less than about 0.25; and a ratio of the acetyl carbonyl carbon resonances appearing at 169.56 to 169.51 ppm to total degree of substitution of less than or equal to about 0.11, wherein the carbon-13 nuclear magnetic resonance spectrum is obtained at 67.9 MHz and about 80° C. for a solution of cellulose ester in DMSO-$d_6$, said sample having a concentration of about 100 mg of cellulose ester per mL of DMSO-d6 and in the range of about 3 up to 50 mg of chromium (III) acetylacetonate per 300 mg of cellulose acetate.

27. A process in accordance with claim 1 wherein at least one solvolysis promoter is selected from Group IIB compounds which are at least sparingly soluble in the reaction medium.

28. A process in accordance with claim 27 wherein said Group IIB compounds are selected from: zinc acetate, or zinc chloride, as well as mixtures thereof.

29. A process in accordance with claim 28 wherein the product is a water absorbent cellulose acetate which has:
(i) a degree of substitution falling in the range of 0.4 up to 1.2,
(ii) an inherent viscosity, measured at a temperature of 25° C. for a 0.25 gram sample in 100 mL of DMSO, in the range of about 0.2 up to 2.5 deciliters/gram, and
(iii) a ratio in the carbon-13 nuclear magnetic resonance spectrum of said composition of the area of the acetyl carbonyl carbon resonances appearing at 169.56 to 169.51 ppm, relative to tetramethylsilane, to the area of the acetyl carbonyl carbon resonances appearing at 169.45 to 169.37 ppm, in the range of about 0.2 to about 0.5, a ratio of the area of the acetyl carbonyl carbon resonances appearing at 169.56 to 169.51 ppm, relative to tetramethylsilane, to the area of the acetyl carbonyl carbon resonances appearing at 169.16 to 169.05 ppm, of less than about 1.1, a ratio of the area of the acetyl carbonyl carbon resonances appearing at 169.56 to 169.51 ppm, relative to tetramethylsilane, to the area of the acetyl carbonyl carbon resonances appearing at 169.56 to 169.05 ppm of about 0.13 to about 0.24; and a ratio of the acetyl carbonyl carbon resonances appearing between 169.56 and 169.51 ppm to total degree of substitution of less than about 0.11, wherein the carbon-13 nuclear magnetic resonance spectrum is obtained at 67.9 MHz and about 80° C. for a solution of cellulose ester in DMSO-$d_6$, said sample having a concentration of about 100 mg of cellulose ester per mL of DMSO-$d_6$ and in the range of about 3 up to 50 mg of chromium (III) acetylacetonate per 300 mg of cellulose acetate.

30. A process in accordance with claim 1 wherein at least one solvolysis promoter is selected from Group IIIB compounds which are at least sparingly soluble in the reaction medium.

31. A process in accordance with claim 30 wherein said Group IIIB compounds are selected from: yttrium (III) acetate, or lanthanum (III) acetate, as well as mixtures thereof.

32. A process in accordance with claim 1 wherein at least one solvolysis promoter is selected from Group IVB compounds which are at least sparingly soluble in the reaction medium.

33. A process in accordance with claim 32 wherein said Group IVB compounds are selected from: titanium (IV) isopropoxide, or zirconium (IV) acetate, as well as mixtures thereof.

34. A process in accordance with claim 1 wherein at least one solvolysis promoter is selected from Group VB compounds which are at least sparingly soluble in the reaction medium.

35. A process in accordance with claim 34 wherein the Group VB compound is vanadium (III) acetylacetonate.

36. A process in accordance with claim 1 wherein at least one solvolysis promoter is selected from Group VIB compounds which are at least sparingly soluble in the reaction medium.

37. A process in accordance with claim 36 wherein said Group VIB compounds are selected from: molybdenum (VI) oxide, molybdenum hexacarbonyl, molybdenum (II) acetate dimer, molybdenum (II) bromide, sodium molybdate, magnesium molybdate, tungsten tetra. chloride, tungsten hexachloride, tungsten hexacarbonyl, or chromium (II) acetate, as well as mixtures of any two or more thereof.

38. A process in accordance with claim 36 wherein said Group VIB compounds are selected from: molybdenum (VI) oxide, molybdenum hexacarbonyl, molybdenum (II) acetate dimer, or molybdenum (II) bromide, as well as mixtures of any two or more thereof.

39. A process in accordance with claim 38 wherein the product is a water soluble cellulose acetate which has:
(i) a degree of substitution falling in the range of 0.4 up to 1.2,
(ii) an inherent viscosity, measured at a temperature of 25° C. for a 0.25 gram sample in 100 mL of DMSO, in the range of about 0.1 up to 2.5 deciliters/gram, and
(iii) a ratio in the carbon-13 nuclear magnetic resonance spectrum of said composition of the area of the acetyl carbonyl carbon resonances appearing at 169.56 to 169.51 ppm, relative to tetramethylsilane, to the area of the acetyl carbonyl carbon resonances appearing at 169.45 to 169.37 ppm, in the range of about 0.54 to about 1.0, a ratio of the area of the acetyl carbonyl carbon resonances appearing at 169.56 to 169.51 ppm, relative to tetramethylsilane, to the area of the acetyl carbonyl carbon resonances appearing at 169.16 to 169.05 ppm, of greater than about 2.2, a ratio of the area of the acetyl carbonyl carbon resonances appearing at 169.56 to 169.51 ppm, relative to tetramethylsilane, to the area of the acetyl carbonyl carbon resonances appearing at 169.56 to 169.05 ppm of about 0.35 to about 0.36; and a ratio of the acetyl carbonyl carbon resonances appearing at 169.56 to 169.51 ppm to the total degree of substitution of greater than about 0.11, wherein the carbon-13 nuclear magnetic resonance spectrum is obtained at 67.9 MHz and about 80° C. for a solution of cellulose ester in DMSO-$d_6$, said sample having a concentration of about 100 mg of cellulose ester per mL of DMSO-$d_6$ and in the range of about 3 up to 50 mg of chromium (III) acetylacetonate per 300 mg of cellulose acetate.

40. A process in accordance with claim 1 wherein at least one solvolysis promoter is selected from Group VIIB compounds which are at least sparingly soluble in the reaction medium.

41. A process in accordance with claim 40 wherein said Group VIIB compounds are selected from: manganese (II) acetate, manganese (II) chloride, or manganese (II) carbonate, as well as mixtures of any two or more thereof.

42. A process in accordance with claim 1 wherein at least one solvolysis promoter is selected from Group VIII compounds which are at least sparingly soluble in the reaction medium.

43. A process in accordance with claim 42 wherein said Group VIII compounds are selected from: iron (II) acetate, iron (III) acetate, cobalt (II) acetate, nickel (II) acetate, or palladium (II) acetate/triphenyl phosphine, as well as mixtures of any two or more thereof.

44. A process in accordance with claim 1 wherein the amount of solvolysis promoter employed falls in the range of about 0.001 up to 10 mol %, based on the moles of cellulose ester.

45. A process in accordance with claim 1 wherein the amount of solvolysis promoter falls in the range of about 0.03 up to 1.5 mol %, based on the moles of cellulose ester.

46. A process in accordance with claim 1 wherein the quantity of co-solvent employed falls in the range of about 0 up to 80 vol %, on a vol/vol basis relative to the alcohol or polyol component.

47. A process in accordance with claim 1 wherein the quantity of co-solvent employed falls in the range of about 0 up to 60 vol %, on a vol/vol basis relative to the alcohol or polyol component.

48. A process in accordance with claim 1 wherein the concentration of cellulose ester in said solvent system falls in the range of about 0.33 up to 20%, calculated as the weight of ester per volume of solvent system.

49. A process in accordance with claim 1 wherein the concentration of cellulose ester in said solvent system falls in the range of about 1.5 up to 13%, calculated as the weight of ester per volume of solvent system.

50. A process in accordance with claim 1 wherein said contacting is carried out for a reaction time in the range of about 0.5 up to 12 hours, and a reaction temperature in the range of about 120° C. up to 175° C.

51. The composition of matter prepared by the process of claim 1.

52. The composition of matter prepared by the process of claim 18.

53. The composition of matter prepared by the process of claim 25.

54. The composition of matter prepared by the process of claim 28.

55. The composition of matter prepared by the process of claim 38.

56. Composition of matter comprising a water absorbent cellulose acetate having:
 (i) a degree of substitution falling in the range of 0.4 up to 1.2,
 (ii) an inherent viscosity, measured at a temperature of 25° C. for a 0.25 gram sample in 100 mL of DMSO, of at least about 0.1 deciliter/gram, and
 (iii) a carbon-13 nuclear magnetic resonance spectrum having (a) a ratio of the area of acetyl carbonyl carbon resonances appearing between 169.56 and 169.51 ppm to the area of acetyl carbonyl carbon resonances appearing between 169.45 and 169.37 ppm of less than about 0.5,
 (b) a ratio of the area of acetyl carbonyl carbon resonances appearing between 169.56 and 169.51 ppm to the area of the acetyl carbonyl carbon resonances appearing between 169.16 and 169.05 ppm of less than about 1.1,
 (c) a ratio of the area of acetyl carbonyl carbon resonances appearing between 169.56 and 169.51 ppm to the area of acetyl carbonyl carbon resonances appearing between 169.56 and 169.05 ppm of less than about 0.25, and
 (d) a ratio of the area of the acetyl carbonyl carbon resonances appearing between 169.56 and 169.51 ppm to total DS of less than or equal to about 0.11,
wherein said carbon-13 nuclear magnetic resonance spectrum is obtained at 67.9 MHz and at 80° C. for a solution of cellulose acetate in DMSO-$d_6$, said solution having a concentration of 100 mg of cellulose acetate per ml of DMSO-$d_6$ and in the range of about 3 to about 50 mg of chromium (III) acetylacetonate per 300 mg of cellulose acetate and wherein the resonances are reported in ppm relative to tetramethylsilane with residual DMSO as an internal reference.

57. Composition of matter in accordance with claim 56 wherein said water absorbent cellulose acetate has an inherent viscosity, measured at a temperature of 25° C. for a 0.25 gram sample in 100 mL of DMSO, in the range of about 0.1 to about 2.5 deciliters/gram.

58. Composition of matter in accordance with claim 56 wherein said water absorbent cellulose acetate has
 (ii) an inherent viscosity, measured at a temperature of 25° C. for a 0.25 gram sample in 100 mL of DMSO, of about 0.1 to about 2.5 deciliters/gram, and
 (iii) a ratio in the carbon-13 nuclear magnetic resonance spectrum of said composition for the area of the acetyl carbonyl carbon resonances appearing at 169.56 to 169.51 ppm, relative to tetramethylsilane, to the area of the acetyl carbonyl carbon resonances appearing at 169.45 to 169.37 ppm, of 0.46 to 0.0, a ratio of the area of the acetyl carbonyl carbon resonances appearing at 169.56 to 169.51 ppm, relative to tetramethylsilane, to the area of the acetyl carbonyl carbon resonances appearing at 169.16 to 169.05 ppm, of 1.0 to 0.0, a ratio of the area of the acetyl carbonyl carbon resonances appearing at 169.56 to 169.51 ppm, relative to tetramethylsilane, to the area of the acetyl carbonyl carbon resonances appearing at 169.56 to 169.05 ppm, of 0.24 to 0.0, and a ratio of the amount of acetyl carbonyl carbon resonances appearing between 169.56 and 169.51 ppm to total degree of substitution of 0.11 to 0.0.

59. Composition of matter in accordance with claim 56 wherein said water absorbent cellulose acetate has
 (ii) an inherent viscosity, measured at a temperature of 25° C. for a 0.25 gram sample in 100 mL of DMSO, in the range of about 0.1 to about 2.5 deciliters/gram, and
 (iii) a ratio in the carbon-13 nuclear magnetic resonance spectrum of said composition of the area of the acetyl carbonyl carbon resonances appearing at 169.56 to 169.51 ppm, relative to tetramethylsilane, to the area of the acetyl carbonyl carbon resonances appearing at 169.45 to 169.37 ppm, of less than about 0.5, a ratio of the area of the acetyl carbonyl carbon resonances appearing at 169.56 to 169.51 ppm, relative to tetramethylsilane, to the area of the acetyl carbonyl carbon resonances appearing at 169.16 to 169.05 ppm, of less than about 1.1, a ratio of the area of the acetyl carbonyl carbon resonances appearing at 169.56 to 169.51 ppm, relative to tetramethylsilane, to the area of the acetyl carbonyl carbon resonances appearing at 169.56 to 169.05 ppm of less than about 0.25; and a ratio of the acetyl carbonyl carbon resonances appearing at 169.56 to 169.51 ppm to total degree of substitution of less than or equal to about 0.11.

60. Composition of matter in accordance with claim 56 wherein said water absorbent cellulose acetate has
(ii) an inherent viscosity, measured at a temperature of 25° C. for a 0.25 gram sample in 100 mL of DMSO, in the range of about 1.3 to about 2.5 deciliters/gram, and
(iii) a ratio in the carbon-13 nuclear magnetic resonance spectrum of said composition of the area of the acetyl carbonyl carbon resonances appearing at 169.56 to 169.51 ppm, relative to tetramethylsilane, to the area of the acetyl carbonyl carbon resonances appearing at 169.45 to 169.37 ppm, of about 0, a ratio of the area of the acetyl carbonyl carbon resonances appearing at 169.56 to 169.51 ppm, relative to tetramethylsilane, to the area of the acetyl carbonyl carbon resonances appearing at 169.16 to 169.05 ppm, of about 0.0, a ratio of the area of the acetyl carbonyl carbon resonances appearing at 169.56 to 169.51 ppm, relative to tetramethylsilane, to the area of the acetyl carbonyl carbon resonances appearing at 169.56 to 169.05 ppm of about 0.0; and a ratio of the acetyl carbonyl carbon resonances appearing at 169.56 to 169.51 ppm to total degree of substitution of about 0.0.

61. Composition of matter in accordance with claim 56 wherein said water absorbent cellulose acetate has
(ii) an inherent viscosity, measured at a temperature of 25° C. for a 0.25 gram sample in 100 mL of DMSO, in the range of about 0.1 to about 2.5 deciliters/gram, and
(iii) a ratio in the carbon-13 nuclear magnetic resonance spectrum of said composition of the area of the acetyl carbonyl carbon resonances appearing at 169.56 to 169.51 ppm, relative to tetramethylsilane, to the area of the acetyl carbonyl carbon resonances appearing at 169.45 to 169.37 ppm, of less than about 0.5, a ratio of the area of the acetyl carbonyl carbon resonances appearing at 169.56 to 169.51 ppm, relative to tetramethylsilane, to the area of the acetyl carbonyl carbon resonances appearing at 169.16 to 169.05 ppm, of less than about 1.6, a ratio of the area of the acetyl carbonyl carbon resonances appearing at 169.56 to 169.51 ppm, relative to tetramethylsilane, to the area of the acetyl carbonyl carbon resonances appearing at 169.56 to 169.05 ppm of less than about 0.25; and a ratio of the acetyl carbonyl carbon resonances appearing at 169.56 to 169.51 ppm to total degree of substitution of less than or equal to about 0.11.

62. Composition of matter in accordance with claim 56 wherein said water absorbent cellulose acetate has
(ii) an inherent viscosity, measured at a temperature of 25° C. for a 0.25 gram sample in 100 mL of DMSO, in the range of about 1.3 to about 2.5 deciliters/gram, and
(iii) a ratio in the carbon-13 nuclear magnetic resonance spectrum of said composition of the area of the acetyl carbonyl carbon resonances appearing at 169.56 to 169.51 ppm, relative to tetramethylsilane, to the area of the acetyl carbonyl carbon resonances appearing at 169.45 to 169.37 ppm, of about 0.28, a ratio of the area of the acetyl carbonyl carbon resonances appearing at 169.56 to 169.51 ppm, relative to tetramethylsilane, to the area of the acetyl carbonyl carbon resonances appearing at 169.16 to 169.05 ppm, of less than about 1.6, a ratio of the area of the acetyl carbonyl carbon resonances appearing at 169.56 to 169.51 ppm, relative to tetramethylsilane, to the area of the acetyl carbonyl carbon resonances appearing at 169.56 to 169.05 ppm of about 0.19; and a ratio of the acetyl carbonyl carbon resonances appearing at 169.56 to 169.51 ppm to total degree of substitution of less than or equal to about 0.11.

63. Composition of matter in accordance with claim 56 wherein said water absorbent cellulose acetate has
(ii) an inherent viscosity, measured at a temperature of 25° C. for a 0.25 gram sample in 100 mL of DMSO, in the range of about 0.1 to about 2.5 deciliters/gram, and
(iii) a ratio in the carbon-13 nuclear magnetic resonance spectrum of said composition of the area of the acetyl carbonyl carbon resonances appearing at 169.56 to 169.51 ppm, relative to tetramethylsilane, to the area of the acetyl carbonyl carbon resonances appearing at 169.45 to 169.37 ppm, in the range of about 0.2 to about 0.5, a ratio of the area of the acetyl carbonyl carbon resonances appearing at 169.56 to 169.51 ppm, relative to tetramethylsilane, to the area of the acetyl carbonyl carbon resonances appearing at 169.16 to 169.05 ppm, of less than about 1.1, a ratio of the area of the acetyl carbonyl carbon resonances appearing at 169.56 to 169.51 ppm, relative to tetra methylsilane, to the area of the acetyl carbonyl carbon resonances appearing at 169.56 to 169.05 ppm of about 0.13 to about 0.24; and a ratio of the acetyl carbonyl carbon resonances appearing between 169.56 and 169.51 ppm to total degree of substitution of less than about 0.11.

64. Composition of matter in accordance with claim 56 wherein said water absorbent cellulose acetate has
(ii) an inherent viscosity, measured at a temperature of 25° C. for a 0.25 gram sample in 100 mL of DMSO, in the range of about 1.3 to about 2.5 deciliters/gram, and
(iii) a ratio in the carbon-13 nuclear magnetic resonance spectrum of said composition of the area of the acetyl carbonyl carbon resonances appearing at 169.56 to 169.51 ppm, relative to tetramethylsilane, to the area of the acetyl carbonyl carbon resonances appearing at 169.45 to 169.37 ppm, in the range of about 0.22 to about 0.46, a ratio of the area of the acetyl carbonyl carbon resonances appearing at 169.56 to 169.51 ppm, relative to tetramethylsilane, to the area of the acetyl carbonyl carbon resonances appearing at 169.16 to 169.05 ppm, of less than about 1.1, a ratio of the area of the acetyl carbonyl carbon resonances appearing at 169.56 to 169.51 ppm, relative to tetra methylsilane, to the area of the acetyl carbonyl carbon resonances appearing at 169.56 to 169.05 ppm of about 0.13 to about 0.24; and a ratio of the acetyl carbonyl carbon resonances appearing between 169.56 and 169.51 ppm to total degree of substitution of about 0.06 to about 0.11.

65. A composition in accordance with claim 56 wherein said carbon-13 nuclear magnetic resonance spectrum for the region falling between about 168.5 parts per million, relative to tetramethylsilane as standard, and 170.1 parts per million, is substantially as shown in FIG. 1.

Figure 2:
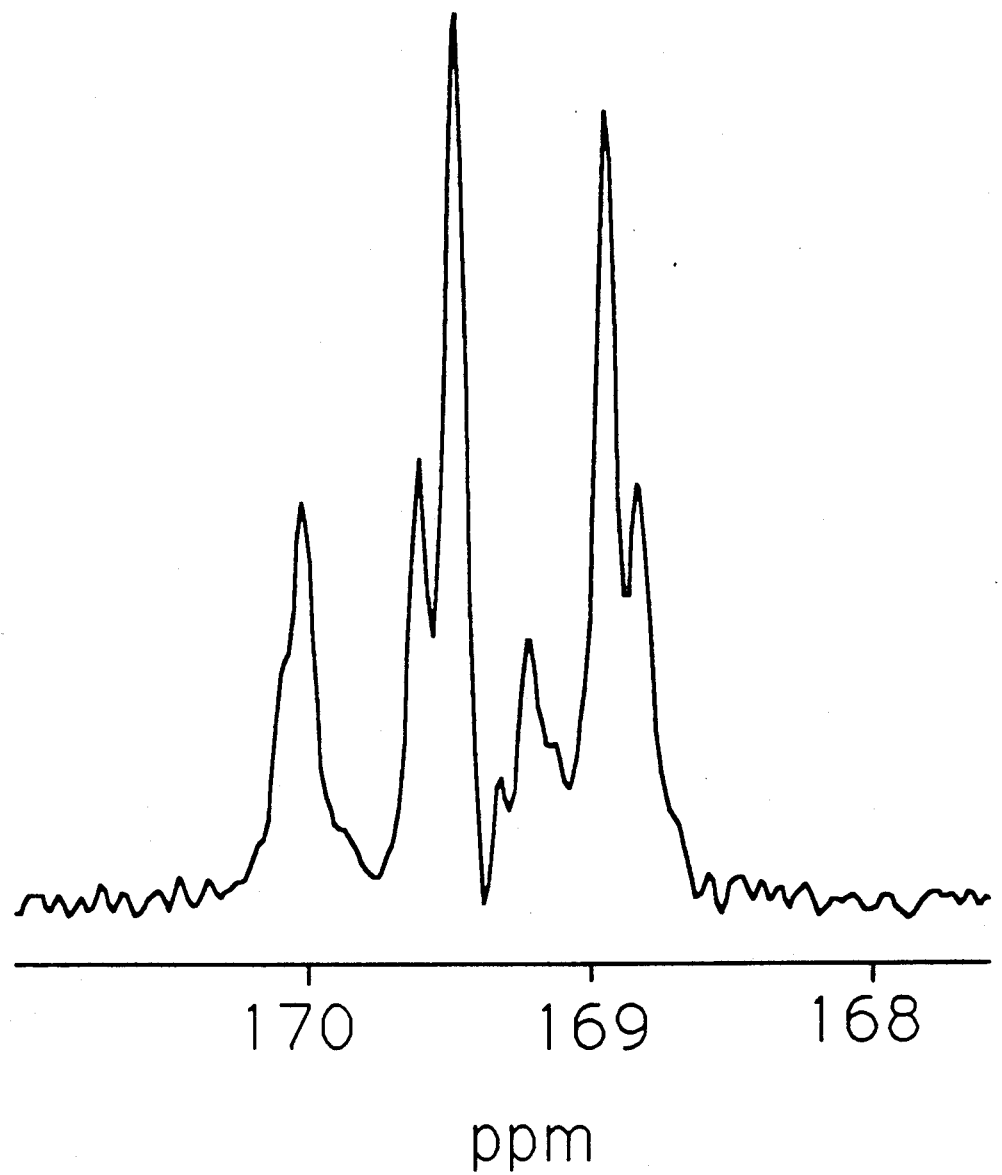
FIG. 2 is the carbon-13 NMR spectrum of the carbonyl carbons for Example 3.

66. A composition in accordance with claim 56 wherein said carbon-13 nuclear magnetic resonance spectrum for the region falling between about 168.5 parts per million, relative to tetramethylsilane as standard, and 170.1 parts per million, is substantially as shown in FIG. 2.

67. A composition in accordance with claim 56 wherein said carbon-13 nuclear magnetic resonance spectrum for the region falling between about 168.5 parts per million, relative to tetramethylsilane as standard, and 170.1 parts per million, is substantially as shown in FIG. 3.

68. A composition in accordance with claim 56 wherein said carbon-13 nuclear magnetic resonance spectrum for the region falling between about 168.5 parts per million, relative to tetramethylsilane as standard, and 170.1 parts per million, is substantially as shown in FIG. 4.

69. A composition in accordance with claim 56 wherein said carbon-13 nuclear magnetic resonance spectrum for the region falling between about 168.5 parts per million, relative to tetramethylsilane as standard, and 170.1 parts per million, is substantially as shown in FIG. 7.

70. Composition of matter comprising a water soluble cellulose acetate having:
(i) a degree of substitution falling in the range of 0.4 up to 1.2,
(ii) an inherent viscosity, measured at a temperature of 25° C. for a 0.25 gram sample in 100 mL of DMSO, of at least about 0.1 deciliter/gram, and
(iii) a carbon-13 nuclear magnetic spectrum having
    (a) a ratio of the area of acetyl carbonyl carbon resonances appearing between 169.56 and 169.51 ppm to the area of acetyl carbonyl carbon resonances appearing between 169.45 and 169.37 ppm of greater than about 0.5,
    (b) a ratio of the area of acetyl carbonyl carbon resonances appearing between 169.56 and 169.51 ppm to the area of acetyl carbonyl carbon resonances appearing between 169.16 and 169.05 ppm of greater than about 1.1,
    (c) a ratio of the area of acetyl carbonyl carbon resonances appearing between 169.56 and 169.51 ppm to the area of acetyl carbonyl carbon resonances appearing between 169.56 and 169.05 ppm of greater than about 0.25, and
    (d) a ratio of the area of acetyl carbonyl carbon resonances appearing between 169.56 and 169.51 ppm to total DS of greater than about 0.11,
wherein said carbon-13 nuclear magnetic resonance spectrum is obtained at 67.9 MHz and at 80° C. for a solution of cellulose acetate in DMSO-$d_6$, said solution having a concentration of 100 mg of cellulose acetate per ml of DMSO-$d_6$ and in the range of about 3 to about 50 mg of chromium (III) acetylacetonate per 300 mg of cellulose acetate and wherein the resonances are reported in ppm relative to tetramethylsilane with residual DMSO as an internal reference.

71. A composition in accordance with claim 70 wherein said water soluble cellulose acetate has
(ii) an inherent viscosity, measured at a temperature of 25° C. for a 0.25 gram sample in 100 mL of DMSO, in the range of about 0.1 to about 1.3 deciliters/gram, and
(iii) a ratio in the carbon-13 nuclear magnetic resonance spectrum of said composition of the area of the acetyl carbonyl carbon resonances appearing at 169.56 to 169.51 ppm, relative to tetramethylsilane, to the area of the acetyl carbonyl carbon resonances appearing at 169.45 to 169.37 ppm, in the range of 0.54 to 1.5, a ratio of the area of the acetyl carbonyl carbon resonances appearing at 169.56 to 169.51 ppm, relative to tetramethylsilane, to the area of the acetyl carbonyl carbon resonances appearing at 169.16 to 169.05 ppm, of 1.1 to 2.5, a ratio of the area of the acetyl carbonyl carbon resonances appearing at 169.56 to 169.51 ppm, relative to tetramethylsilane, to the area of the acetyl carbonyl carbon resonances appearing at 169.56 to 169.05 ppm of 0.26 to 0.4; and a ratio of the acetyl carbonyl carbon resonances appearing at 169.56 to 169.51 ppm to the total degree of substitution of 0.13 to 0.25.

72. A composition in accordance with claim 70 wherein said water soluble cellulose acetate has
(ii) an inherent viscosity, measured at a temperature of 25° C. for a 0.25 gram sample in 100 mL of DMSO, in the range of about 0.1 to about 2.5 deciliters/gram, and
(iii) a ratio in the carbon-13 nuclear magnetic resonance spectrum of said composition of the area of the acetyl carbonyl carbon resonances appearing at 169.56 to 169.51 ppm, relative to tetramethylsilane, to the area of the acetyl carbonyl carbon resonances appearing at 169.45 to 169.37 ppm, in the range of about 0.54 to about 1.0, a ratio of the area of the acetyl carbonyl carbon resonances appearing at 169.56 to 169.51 ppm, relative to tetramethylsilane, to the area of the acetyl carbonyl carbon resonances appearing at 169.16 to 169.05 ppm, of greater than about 2.2, a ratio of the area of the acetyl carbonyl carbon resonances appearing at 169.56 to 169.51 ppm, relative to tetramethylsilane, to the area of the acetyl carbonyl carbon resonances appearing at 169.56 to 169.05 ppm of about 0.35 to about 0.36; and a ratio of the acetyl carbonyl carbon resonances appearing at 169.56 to 169.51 ppm to the total degree of substitution of greater than about 0.11.

73. A composition in accordance with claim 70 wherein said water soluble cellulose acetate has
(ii) an inherent viscosity, measured at a temperature of 25° C. for a 0.25 gram sample in 100 mL of DMSO, in the range of about 0.1 to about 1.3 deciliters/gram, and
(iii) a ratio in the carbon-13 nuclear magnetic resonance spectrum of said composition of the area of the acetyl carbonyl carbon resonances appearing at 169.56 to 169.51 ppm, relative to tetramethylsilane, to the area of the acetyl carbonyl carbon resonances appearing at 169.45 to 169.37 ppm, in the range of about 0.55 to about 0.87, a ratio of the area of the acetyl carbonyl carbon resonances appearing at 169.56 to 169.51 ppm, relative to tetramethylsilane, to the area of the acetyl carbonyl carbon resonances appearing at 169.16 to 169.05 ppm, of greater than about 2.2, a ratio of the area of the acetyl carbonyl carbon resonances appearing at 169.56 to 169.51 ppm, relative to tetramethylsilane, to the area of the acetyl carbonyl carbon resonances appearing at 169.56 to 169.05 ppm of about 0.35 to about 0.36; and a ratio of the acetyl carbonyl carbon resonances appearing at 169.56 to 169.51 ppm to the total degree of substitution of about 0.19 to about 0.20.

74. A composition in accordance with claim 70 wherein said carbon-13 nuclear magnetic resonance spectrum for the region falling between about 168.5 parts per million, relative to tetramethylsilane as standard, and 170.1 parts per million, is substantially as shown in FIG. 6.

75. A composition in accordance with claim 70 wherein said carbon-13 nuclear magnetic resonance spectrum for the region falling between about 168.5 parts per million, relative to tetramethylsilane as standard, and 170.1 parts per million, is substantially as shown in FIG. 5.

* * * * *

UNITED STATES PATENT AND TRADEMARK OFFICE
CERTIFICATE OF CORRECTION

PATENT NO. : 5,142,034

DATED : August 25, 1992

INVENTOR(S) : Bellas et al.

It is certified that error appears in the above-identified patent and that said Letters Patent is hereby corrected as shown below:

In Table I, columns 19 and 20, under the heading "Solvolysis Promoter", the entry for Example 1 should read --- $Mg(OAc)_2$ ---.

In Table I, columns 19 and 20, under the heading "Solvolysis Promoter", the entry for Example 2 should read --- $Mg(OAc)_2$ ---.

In Table I, columns 19 and 20, under the heading "Solvolysis Promoter", the entry for Example 3 should read --- $Zn(OAc)_2$ ---.

In Table I, columns 19 and 20, under the heading "Solvolysis Promoter", the entry for Example 4 should read --- $Zn(OAc)_2$ ---.

In Table I, columns 19 and 20, under the heading "Solvolysis Promoter", the entry for Example 8 should read --- $MoO_3$ ---.

In Table II, columns 19 and 20, under the heading "Solvolysis Promoter", the entry for Example 1 should read --- $Mg(OAc)_2$ ---.

In Table II, columns 19 and 20, under the heading "Solvolysis Promoter", the entry for Example 3 should read --- $Zn(OAc)_2$ ---.

UNITED STATES PATENT AND TRADEMARK OFFICE
CERTIFICATE OF CORRECTION

PATENT NO. : 5,142,034
DATED : August 25, 1992
INVENTOR(S) : Bellas et al.

It is certified that error appears in the above-identified patent and that said Letters Patent is hereby corrected as shown below:

In Table II, columns 19 and 20, under the heading "Solvolysis Promoter", the entry for Example 4 should read --- $Zn(OAc)_2$ ---.

In Table II, columns 19 and 20, under the heading "Solvolysis Promoter", the entry for Example 8 should read --- $MoO_3$ ---.

Signed and Sealed this

Second Day of November, 1993

Attest:

BRUCE LEHMAN

Attesting Officer    Commissioner of Patents and Trademarks